United States Patent
Bauer et al.

(10) Patent No.: US 7,985,868 B1
(45) Date of Patent: Jul. 26, 2011

(54) HYBRID METAL ORGANIC SCINTILLATOR MATERIALS SYSTEM AND PARTICLE DETECTOR

(75) Inventors: Christina A. Bauer, Atlanta, GA (US); Mark D. Allendorf, Fremont, CA (US); F. Patrick Doty, Livermore, CA (US); Blake A. Simmons, San Francisco, CA (US)

(73) Assignee: Sandia Corporation, Livermore, CA (US)

( * ) Notice: Subject to any disclaimer, the term of this patent is extended or adjusted under 35 U.S.C. 154(b) by 1117 days.

(21) Appl. No.: 11/800,136

(22) Filed: May 4, 2007

Related U.S. Application Data

(60) Provisional application No. 60/856,210, filed on Nov. 1, 2006.

(51) Int. Cl.
*C30B 29/06* (2006.01)

(52) U.S. Cl. ........ 549/529; 549/523; 549/531; 549/533; 549/534; 549/536

(58) Field of Classification Search .................. 549/529, 549/523, 531, 533, 534, 536
See application file for complete search history.

(56) References Cited

U.S. PATENT DOCUMENTS

| | | | |
|---|---|---|---|
| 5,648,508 A | 7/1997 | Yaghi | 556/9 |
| 5,973,328 A | 10/1999 | Hiller | |
| 6,617,467 B1 | 9/2003 | Muller | |
| 6,624,318 B1 * | 9/2003 | Muller et al. | 549/529 |
| 6,876,711 B2 | 4/2005 | Wallace | |
| 6,893,564 B2 | 5/2005 | Mueller | 210/502.1 |
| 6,929,679 B2 | 8/2005 | Muller | 95/90 |
| 6,930,193 B2 | 8/2005 | Yaghi | 556/46 |
| 7,105,832 B2 | 9/2006 | Dai | |
| 2003/0004364 A1 | 1/2003 | Yaghi | 556/46 |
| 2003/0148165 A1 | 8/2003 | Muller | 429/34 |
| 2003/0222023 A1 | 12/2003 | Mueller | 210/656 |
| 2004/0265670 A1 | 12/2004 | Muller | 429/34 |
| 2005/0124819 A1 | 6/2005 | Yaghi | 556/148 |
| 2005/0154222 A1 | 7/2005 | Muller | 556/118 |
| 2005/0192175 A1 | 9/2005 | Yaghi | 502/1 |

(Continued)

OTHER PUBLICATIONS

M. Mattesini; J. M. Soler; F. Yndurain; "Ab initio study of metal-organic framework-5 Zn4O(1,4-benzenedicarboxylate)3: An assessment of mechanical and spectroscopic properties", Physical Review B, 2006, vol. 73, No. 9, pp. 094111(8).

(Continued)

*Primary Examiner* — Robert M Kunemund
(74) *Attorney, Agent, or Firm* — Timothy Evans

(57) ABSTRACT

We describe the preparation and characterization of two zinc hybrid luminescent structures based on the flexible and emissive linker molecule, trans-(4-R,4'-R') stilbene, where R and R' are mono- or poly-coordinating groups, which retain their luminescence within these solid materials. For example, reaction of trans-4,4'-stilbenedicarboxylic acid and zinc nitrate in the solvent dimethylformamide (DMF) yielded a dense 2-D network featuring zinc in both octahedral and tetrahedral coordination environments connected by trans-stilbene links. Similar reaction in diethylformamide (DEF) at higher temperatures resulted in a porous, 3-D framework structure consisting of two interpenetrating cubic lattices, each featuring basic to zinc carboxylate vertices joined by trans-stilbene, analogous to the isoreticular MOF (IRMOF) series. We demonstrate that the optical properties of both embodiments correlate directly with the local ligand environments observed in the crystal structures. We further demonstrate that these materials produce high luminescent response to proton radiation and high radiation tolerance relative to prior scintillators. These features can be used to create sophisticated scintillating detection sensors.

20 Claims, 22 Drawing Sheets

U.S. PATENT DOCUMENTS

| | | | |
|---|---|---|---|
| 2006/0154807 A1 | 7/2006 | Yaghi | 502/150 |
| 2006/0185388 A1 | 8/2006 | Muller | 62/606 |
| 2006/0230926 A1 | 10/2006 | Fritsch | |
| 2006/0252641 A1 | 11/2006 | Yaghi | 502/401 |
| 2006/0269033 A1 | 11/2006 | Taleyarkhan | |

OTHER PUBLICATIONS

Andryushchenko. L. A.; Budakovskii, S.V.; Galunov, N.Z.: Gordienko. L.S.; Grinev, B.V.: Zelenskaya, O.V.: Kosinov, N. N.; Mnatsakanova, T.R.; Tarasenko. O.A.; Teplitskaya, T.A.; "Organic Polycrystalline Scintillators with Improved Characteristics", Instruments and Experimental Techniques. vol. 46. No. 5. 2003, pp. 591-595.

Yaghi. Omar M.: O'Keefe, Michael: Ockwig, Nathan W.: Chae, Hee K.; Eddaoudi, Mohamed; Kim Jaheon; " Reticular synthesis and the design of new materials", Nature, vol. 423, Jun. 12, 2003. pp. 705-714.

Kim, Jong-Young: Norquist, Alexander J.; O'Hare, Dermot; Incorporation of uranium (vi) into metal-organic framework solids, [UO2(C4H4O4)]H2O,[UO2F(C5H6O4)] 2H2O, and [(UO2)1.5(C8H4O4)2]2[(CH3)2NCOH2] H2O. Dalton Transactions 2003. pp. 2813-2814.

Mueller, U.: Schubert, M.; Teich. F.; Puetter, H.; Schierle-Arndt, K.; Pastre, J.; "Metal-organic frameworks—prospective industrial applications", Journal of Materials Chemistry, 2006. vol. 16, pp. 626-636.

Saltiel, J.; Marinari, A.; Chang, D. W.-L.; Mitchener, J. C.; and Megarity, E. D.; "Trans-Cis Photoisomerization of the Stilbenes and a Reexamination of the Positional Dependence of the Heavy-Atom Effect", J. Am. Chem. Soc., 1979, 101, pp. 2982-2996.

Meier, H.; "The Photochemistry of Stilbenoid Compounds and Their Role in Materials Technology", Angew. Chem. Int. Ed., 1992, v.31(11), pp. 1399-1420.

Albota, M.; Beljonne; D.; Bredas, J-L.: Ehrlich, J. E.; Fu, J-Y.; Heikal, A. A.; Hess, S. E.; Kogej, T.; Levin, M. D.; Marder, S. R.; Mc-Cord-Maughon, D.; Perry, J. W.; Rockel, H.; Rumi, M.; Subramaniam, G.; Webb, W. W.; Wu, X-L.; and Xu, C.; "Design of Organic Molecules with Large Two-Photon Absorption Cross Sections", Science, 1998, v.281, pp. 1653-1656.

Cornil, J.; dos Santos, D. A.; Crispin, X.; Silbey, R.; and Bredas, J. L.; "Influence of Interchain Interactions on the Absorption and Luminescence of Conjugated Oligomers and Polymers: A Quantum-Chemical Characterization", J. Am. Chem. Soc., 1998, v. 120, pp. 1289-1299.

Cacialli, F., Chuah, B. S.; Kim, J. S.; dos Santos, D. A.; Friend, R. H.; Moratti, S. C., Holmes, A. B.; and Bredas, J. L.; "A Green Emitting, Alkoxy Disubstituted Poly(p-phenylene vinylene) for Electroluminescent Devices", Synth. Met., 1999, v. 102, pp. 924-925.

Eddaoudi, M.; Li, H.; and Yaghi, O. M.; "Highly Porous and Stable Metal—Organic Frameworks: Structure Design and Sorption Properties", J. Am. Chem. Soc., 2000, v. 122, pp. 1391-1397.

Eddaoudi, M.; Kim, J.; Rosi, N.; Vodak, D.; Wachter, J.; O'Keeffe, M.; and Yaghi, O.M.; "Systematic Design of Pore Size and Functionality in Isoreticular MOFs and Their Application in Methane Storage", Science, 2002, v. 295, pp. 469-472.

Evans, O. R.; and Lin, W.; "Crystal Engineering of NLO Materials Based on Metal—Organic Coordination Networks", Acc. Chem. Res., 2002, v. 35(7), pp. 511-522.

Oelgemoller, M.; Brem, B.; Frank, R.; Schneider, S.; Lenoir, D.; Hertkort, N.; Origane, Y. Lemmen, P.; Lex, J.; and Inoue, Y.; "Cyclic trans-stilbenes: synthesis, structural and spectroscopic characterization, photophysical and photochemical properties" J. Chem. Soc., Perkin Trans 2., 2002, pp. 1760-1771.

Zojer, E.; Beljonne, D.; Kogej, T., Vogel, H.; Marder, S. R.; Perry, J. W.; and Bredas, J. L.; "Tuning the two-photon absorption response of quadrupolar organic molecules", J. Chem. Phys., 2002, v.116(9), pp. 3646-3658.

Janiak, C.; "Engineering coordination polymers towards applications", J. Chem. Soc., Dalton Trans., 2003, pp. 2781-2804.

Bordiga, S.; Lamberti, C.; Ricchiardi, G.; Regli, L.; Bonino, F.; Damin, a; Lillerud, K.-P.; Bjorgen, M.; and Zecchina, A.; "Electronic and vibrational properties of a MOF-5 metal-organic framework: ZnO quantum dot behaviour", Chem. Commun., 2004, pp. 2300-2301.

Kitagawa, S.; Kitaura, R.; and Noro, S.; "Functional Porous Coordination Polymers", Angew. Chem. Int. Ed., 2004, v.43, pp. 2334-2375.

Rowsell, J. L. C.; and Yaghi, O. M.; "Metal-organic frameworks: a new class of porous materials", Micropor. Mesopor. Mater., 2004, v. 73, pp. 3-14.

Wang, X-L.; Qin, C.; Wang, E-B., Xu, L.; Su, Z-M.; and Hu, C-W.; "Interlocked and Interdigitated Architectures from Self-Assembly of Long Flexible Ligands and Cadmium Salts", Angew. Chem. Int. Ed., 2004, v.43, pp. 5036-5040.

de Lill, D. T.; Gunning, N. S.; and Cahill, C. L.; "Toward Templated Metal-Organic Frameworks: Synthesis, Structures, Thermal Properties, and Luminescence of Three Novel Lanthanide-Adipate Frameworks", Inorg. Chem., 2005, v.44(2), pp. 258-266.

Kaschuck, Y.; and Esposito, B.; "Neutron/γ-ray digital pulse shape discrimination with organic scintillators", Nuc. Inst. Meth. Phys. Res A., 2005, v.551, pp. 420-428.

Lee, E. Y.; Jang, S. Y.; and Suh, M. P.; "Multifunctionality and Crystal Dynamics of a High Stable, Porous Metal-Organic Framework [Zn4O(NTB)2]", J. Am. Chem. Soc., 2005, v.127, pp. 6374-6381.

Millward, A. R.; and Yaghi, O. M.; "Metal-Organic Frameworks with Exceptionally High Capacity for Storage of Carbon Dioxide at Room Temperature", J. Am. Chem. Soc., 2005, v.127, pp. 17998-17999.

Chandler, B. D.; Cramb, D. T.; and Shimizu, G. K. H.; "Microporous Metal-Organic Frameworks Formed in a Stepwise Manner from Luminescent Building Blocks", J. Am. Chem. Soc., 2006, v.128, pp. 10403-10412.

Greathouse, J. A.; and Allendorf, M. D.; "The Interaction of Water with MOF-5 Simulated by Molecular Dynamics", J. Am. Chem. Soc., 2006, v.128, pp. 10678-10679.

Park, G.; Kim, H.; Lee, G. H.; Park, S-K; and Kim, K.; "Solvothermal Synthesis, Crystal Structure, and Magnetic Properties of [Co3(SDA)3(DMF)2]; 2-D Layered Metal-organic Framework Derived from 4,4'-Stilbenedicarboxylic Acid (H2SDA)", Bull. Korean Chem. Soc., 2006, v.27(3), pp. 443-446.

Rowsell, J. L. C.; and Yaghi, O. M.; "Effects of Functionalization, Catenation, and Variation of the Metal Oxide and Organic Linking Units on the Low-Pressure Hydrogen Adsorption Properties of Metal-Organic Frameworks", J. Am. Chem. Soc., 2006, v.128, pp. 1304-1315.

Zhu, L.; Yi, Y.; and Shuai, Z.; Bredas, Jj-L.; Beljonne, D.; and Zojer, E.; "Structure-property relationships for three-photon absorption in stilbene-based dipolar and quadrupolar chromophores", J. Chem. Phys., 2006, v.125, pp. 044101-2 to 044101-7.

Batten, S. R.; and Robson, R.; "Interpenetrating Nets: Ordered, Periodic Entanglement", Angew. Chem. Int. Ed., 1998, 37, pp. 1460-1494.

Yaghi, O. M.; Li, H.; Davis, C.; Richardson, D.; and Groy, T. L.; "Synthetic Strategies, Structure Patterns, and Emerging Properties in the Chemistry of Modular Porous Solids", Acc. Chem. Res., 1998, v.31, pp. 474-484.

Lee, H. K.; Min, D.; Cho, B-Y.; and Lee, S. W.; "Two-dimensional Copper Coordination Polymers Based on Paddle-Wheel Type Secondary Building Units of Cu2(CO2R)4: [Cu(1,3-BDC)(H2O)] 2H2O and [Cu2(OBC)2(H2O)2] H2O (1,3-BDC = 1,3-benzenedicarboxylate; OBC = 4,4'-oxybis(benzoate))", Bull. Korean Chem. Soc., 2004, v.25(12), pp. 1955-1958.

Mueller, U.; Schubert, M.; Teich, F.; Puetter, H.; Schierle-Arndt, K.; and Pastre, J.; "Metal-organic frameworks—prospective industrial applications", J. Mater. Chem., 2006, v. 16, pp. 626-636.

Kim, J-Y.; Norquist, A. J.; and O-Hare, D.; "Incorporation of uranium (vi) into metal-organic framework solids, [UO2(C4H4O4)] H2O, [UO2F(C5H6O4)] 2H2O, and [UO2)1.5(C8H4O4)2]2[(CH3)2NCOH2] H2O", Royal Soc. Chem. Dalton Trans., 2003, pp. 2813-2814.

Yaghi, O. M.; O'Keefe, M.; Ockwig, N. W.; Chae, H. K.; Eddaoudi, M.; and Kim, J.; "Reticular synthesis and the design of new materials", Nature, 2003, v. 423, pp. 705-714.

* cited by examiner

HYBRID METAL ORGANIC SCINTILLATOR MATERIALS SYSTEM AND PARTICLE DETECTOR

CROSS REFERENCE TO RELATED APPLICATIONS

This application claims priority to prior co-pending provisional U.S. Patent Application Ser. No. 60/856,210 originally filed Nov. 1, 2006 entitled "SYNTHESIS OF A METAL ORGANIC FRAMWORK AS A DETECTOR MATERIAL" from which benefit is claimed.

STATEMENT OF GOVERNMENT SUPPORT

The United States Government has a paid-up license in this invention and the is right in limited circumstances to require the patent owner to license others on reasonable terms as provided for by the terms of contract No. DE-AC04-94AL85000 awarded by the U.S. Department of Energy to Sandia Corporation.

BACKGROUND OF THE INVENTION

1. Field of the Invention

The present invention relates to structures comprising metal-organic coordination polymers including frameworks, or "MOF" crystalline materials which contain scintillating structures within each unit cell of the MOF lattice. The invention more particularly relates to a stilbene MOF which generates a light output when irradiated by light and by subatomic particles, such as protons.

Understanding and predicting the photophysical properties of chromophores in the solid state is important for an increasing number of organic materials applications, where control over the spatial interactions of chromophores represents a significant challenge. The geometry of a molecular assembly is often difficult to predict due to the large number of intermolecular forces that can influence the packing of molecules in a disordered network or crystal. Metal-organic frameworks (MOFs) are a class of crystalline coordination polymers with the potential to control these interactions through appropriate choice of the constituent metal and ligand units. MOFs consist of metal ions or clusters connected by organic linker groups, which can lead to structural rigidity, high porosity, and well-defined architectures. These properties are desirable for a variety of applications, and the use of MOFs for gas storage, drug delivery, separations, and catalysis is currently being explored. The structural stability of MOFs results from strong metal-ligand coordination, which can afford some degree of predictability to the framework geometry and leads towards rational methods of crystal engineering. This has been utilized as a strategy to engineer non-centrosymmetric crystals for nonlinear optics (NLO) applications and asymmetric catalysis, for example. This led us to postulate that MOFs could offer predictable, well-defined environments for chromophores in solid-state materials.

Despite the large number of MOF materials described in the literature, however, reports of luminescent MOFs are scarce, especially those that display ligand-based emission. The majority of materials in this class exhibit metal ion-centered luminescence due to the incorporation of lanthanide elements into their framework. One potential advantage of the use of ligand-based emission in MOFs is that it should readily be tunable through variation of the nature of the linker and/or the structure of the framework. Additionally, calculations to regarding the electronic structure of prototypical porous 3-D MOFs have suggested that the bandgaps of these materials can be altered by changing the degree of conjugation in the ligand. Such factors may prove important for the practical application of these materials.

Our interest in the present case is to provide a stilbene-based MOF. Stilbene has a range of technologically important uses. For example, it is an important component in solid-state scintillating materials, as its luminescence can be used to discriminate neutron and gamma-ray radiation. Additionally, stilbenes are commonly employed as a backbone motif in organic NLO materials, and may be considered the fundamental unit of the electro- and photoluminescent conjugated polymer, poly(para-phenylene vinylene) (PPV). Moreover, incorporation of stilbene as the linker into a MOF lattice effectively suppresses the cis-trans isomerization of stilbene, a nonradiative pathway, by fixing the ligand configuration through rigid coordination, affording a material with increased QY and brightness. Furthermore, stilbene excimer luminescence has been used for sensitive detection of DNA and antibody binding events. We are, therefore, interested in probing structural- and guest-dependent luminescence of stilbene-based MOF materials as model systems and for their potential sensing capabilities.

In particular, ionizing particle and radiation detectors represent a critical need for such disparate fields as homeland security, nuclear nonproliferation, medical imaging and therapy, and oil exploration. This is particularly true, for detectors capable of detecting fast neutrons without degradation of the energy and trajectory information, because the presence of these particles is an indication of fissile elements including weapons-grade nuclear material.

Existing particle detection technologies, however, suffer from several problems that limit their ability to be used for applications such as high-volume cargo screening and portable radiation detection. In particular, because neutrons are uncharged particles they do not ionize matter as they pass through it and, therefore, cannot be detected directly. Instead, neutrons are detected by the signals produced by secondary particles, typically recoil nuclei or energetic ions produced by capture. For example fast neutrons are usually detected as an incoming neutron strikes a target hydrogen atom producing a recoil proton within a scintillation material, which is coupled to an electronic detector such as a photomultiplier.

Many sensor materials can be used to convert neutrons for detection; but each is disadvantaged in some way. Capture reactions require moderation of the neutron energies, destroying all information of trajectory and energy distributions. Furthermore commercially available particle detectors using gas-based, $^3$He, and $BF_3$. These require large volumes of gas at substantial pressures in order to provide adequate sensitivity. These materials also tend to be expensive due to complex manufacturing processes and/or high material costs and some of them, such as boron trifluoride, require special handling due to their poisonous and corrosive nature.

Currently fast neutron scintillation detectors include plastic scintillators and organic liquids based on aromatic small molecules such as toluene and pseudocumene. These conventional organic scintillators are limited by the low light output signal generated from ions as compared with the output generated by gamma and beta radiation. This is caused by the high rate of energy loss (linear energy transfer or LET) by high mass particles resulting in higher rates of non-radiative recombination, and results in a relatively high threshold energy for discrimination of neutrons from background gamma radiation. The open pore structures in MOFs lead to low mass density and therefore reduced LET relative to conventional materials.

2. Related Art

Current methods for overcoming some of the shortcomings of the prior art include using a porous medium doped with a fissionable material for capturing neutrons and incorporating a rare earth material therein that fluoresces when stimulated by fission fragments resulting from the capture reaction. For example Hiller, et al., (U.S. Pat. No. 5,973,328) and Wallace, et al., (U.S. Pat. No. 6,876,711) describe a neutron detector comprised of a fissionable material contained within a glass film fabricated using a sol-gel method. When the glass film is bombarded with neutrons, the fissionable material emits fission particles and electrons that are detected using standard UV and particle detection methods. Dai, et al., (U.S. Pat. No. 7,105,832) describe a composite scintillator for neutron detection comprising a matrix material fabricated from an inorganic sol-gel precursor solution homogeneously doped with a liquid scintillating material and a neutron absorbing material.

SUMMARY

The present invention discloses a method for overcoming limitations of existing approaches including the density, cross section, and linearity factors of the prior art. As described herein the plastic, liquid and sol-gel technologies are replaced with a hybrid metal-organic framework structure (MOF), in order to provide a route for improvements in radiation detection sensitivity and portability.

Materials comprising metal-organic frameworks (MOFs) are a class of nanoporous coordination polymers that can be designed with unique structure and properties for nuclear detector applications. Distinguishing features of MOFs are coordinating metallic groups causing organic "linker" molecules to self-organize into two- and three-dimensional open pore structures. Moreover, the choice of organic linker members enables rational control over pore properties, affording new degrees of freedom to design materials for specific radiation detection applications. Some of the materials properties that may be controllably modified, include:

detector compositions (metals and organic linkages) that can be "tailored" for efficient particle capture, signal generation, and transport;

minimized plasma quenching effects found in existing organic scintillators by choosing low dE/dx structures;

increased detector sensitivity by using host materials with the ability to store high gas densities (e.g. hydrogen and hydrocarbon molecules for fast neutrons;

tailored specificity by incorporating high cross section species for specific reactions ($^{10}$B for slow neutrons; Xe for gamma rays);

direction-sensitive ion channeling materials thus enabling greatly improved discrimination against background radiation, not feasible in plastic scintillation materials;

high resistivity and dielectric strength sensor materials for solid-state ionization chamber detectors; and sorption and stabilization of volatile or hazardous liquid scintillator constituents within an active porous matrix providing enhances signals.

MOFs are not new (see Yaghi, et al., "Synthetic strategies, structure patterns, and emerging properties in the chemistry of modular porous solids," *Accounts of Chemical Research*, v.31(8), 1998: pages 474-484; and Batten, et al., "Interpenetrating nets: Ordered, periodic entanglement," *Angewandte Chemie International Edition in English*, v.37, 1998: is pages 1460-1494). However, as yet no mention has been made for preparing a MOF structure which contains guest atoms with high cross-sections to ionizing radiation and which scintillates.

An object of the present embodiment, therefore, is to disclose a hybrid radiation-sensitive materials system based on coordination polymers;

Another object of the present invention is to provide a porous radioluminescent materials system with a range of structural order varying from amorphous to crystalline;

Another object of the present invention is to provide a MOF structure which incorporates a luminescent organic ligand within its lattice framework;

Another object of the present embodiment is to provide a MOF structure that exhibits efficient fluorescence and optical transmission;

Still another object of the present embodiment is to provide a luminescent MOF structure that is responsive to ionizing radiation;

Yet another object of the present embodiment is to provide a MOF structure that is capable of sensing proton radiation;

A further object of the present embodiment is to provide a MOF structure incorporating specific metal coordination atoms, linkages and guest molecules for subatomic particle capture, signal generation and transport;

Yet another object of the present embodiment is to provide radioluminescent host structures that enable increased uptake of particle capture gas molecules (e.g. Xe, $^3$He, and $BF_3$) at pressures below 100 bars;

Again another object is to provide a materials system capable of rational design of radioluminescent materials with tailored host moieties for gas storage, radiation capture or electronic transport;

A further object is to provide an active radioluminescent host capable of enhancing the properties of liquid scintillators based on aromatic small molecules;

Still another object of the present embodiment is to provide a MOF structure comprising a low LET material in order to minimize plasma quenching effects as ionizing radiation interacts with the MOF structure.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF EMBODIMENT OF THE INVENTION

Figure 1A:
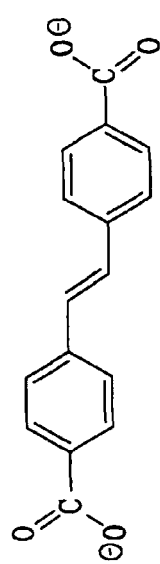
FIG. 1A shows a chemical diagram of trans-4,4'-Stilbene dicarboxylate, linker, L.

The chemistry of coordination polymers enables the rational design of materials with independent control of multiple properties. For example, tailoring of novel solids with regular porosity from the micro to nanopore scale can be achieved while independently varying luminescent properties or chemical affinities. Furthermore, structural order can be varied between rigid crystalline metal organic frameworks (MOF) to amorphous solids. The self assembly of metal ions, which act as coordination centers, linked together with a variety of polyatomic organic bridging ligands, results in tailorable host materials as robust solids with high thermal and mechanical stability.

We describe a ligand-based approach to the synthesis of new luminescent MOF compounds. Zinc-based MOF motifs are used to prepare two extended structures that differ in dimensionality, but feature rigid metal-ligand coordination geometries that provide support for a luminescent linker with an inherent degree of flexibility. One such molecule, for example, is trans-4,4'-stilbenedicarboxylic acid (hereinafter referred to as "$LH_2$" or "linker unit L"), shown in FIG. 1A. More generally, examples of the molecule are trans-(4-R,4'-R') stilbene, where R and R' are mono- or poly-coordinating groups. In these compounds, the stilbene-based linkers are constrained in the trans-orientation, reducing or eliminating the primary non-radiative decay pathway. These materials exhibit fast exponential fluorescence decays that are desirable in scintillators. In addition, fluorescence quantum efficiencies approaching 100% are expected due to the reduction in non-radiative pathways as will be described subsequently.

As discussed above, stilbene is a luminescent molecule that may be considered the fundamental unit of poly(para-phenylene vinylene) ("PPV") conjugated polymers. Stilbene has important uses in solid-state scintillating materials and is commonly employed as a backbone unit in organic nonlinear optics (NLO) materials. Our interest in stilbene based MOFs is two-fold: First, while stilbenes can undergo a light-induced trans-cis isomerization, a non-radiative decay pathway that significantly decreases the photoluminescence quantum yield, the quantum yield can theoretically approach 100% when is this isomer transition is suppressed. Moreover, incorporation of stilbene as the linker into a MOF lattice effectively suppresses this isomerization by fixing the ligand configuration through rigid coordination, affording a material with increased quantum yield and brightness. Second, as indicated above, the low density and regularity of MOFs allows for well-defined-interactions between linkers within the framework and with their environment, which may be investigated spectroscopically by suitable choice of ligand chromophore. And stilbene luminescence has been used for sensing of DNA and antibody binding events. Therefore, we are interested in investigating structural- and guest species-dependent luminescence of stilbene-based MOF structures for potential exploitation in sensing applications.

It is well known that different crystal morphologies can result from the same starting materials under different synthetic conditions. For instance, the use of $Zn(NO_3)_2.xH_2O$ and terephthalic acid can give a variety of MOF structures by varying the reaction conditions used to achieve these structures. With this in mind, we could form two different zinc-stilbene MOFs, allowing for the study of their stilbenoid-based luminescence in both 2-D and 3-D extended structures. We describe here the synthesis, structure, and luminescent properties of these MOFs, along with their optical response to the exchange of solvent guest molecules.

EXAMPLES trans-4,4'-stilbenedicarboxylic acid ($LH_2$) and N,N'-dimethylformamide (DMF) were purchased from Alfa Aesar (Ward Hill, Mass.). $Zn(NO_3)_2 \cdot 6H_2O$ was purchased from Fluka (a subsidiary of Sigma-Aldrich, Milwaukee, Wis.). N,N'-Diethylformamide (DEF) was purchased from TCI America (Portland, Oreg.).

Example 1

A quantity of 71.3 mg of $LH_2$ was added to 20 mL of DMF in a clean glass beaker and agitated until almost fully dissolved. To this was added 209.2 mg zinc nitrate hexahydrate ($Zn(NO_3)_2 \cdot 6H_2O$) giving a 3:1 mole ratio of metal to linker (while the hexahydrate was used in the present example, other forms of the hydrate may also be used). The beaker holding this solution was then sealed and placed in an oven at 75° C. for 16 hours, after which the temperature of the solution was increased to 85° C. and held for an additional 4 hours. Upon cooling, there resulted yellow, needle-like crystals, hereinafter referred to as crystal 1. The yield was 75.2 mg or 74% based on the linker.

These crystals were collected and washed three times with fresh DMF, three times with chloroform, dried at 90° C. in vacuo for 24 hours and then stored under ambient conditions. The chemical formula and structure of these crystals were determined to be $Zn_3L_3(DMF)_2$ via crystallography and elemental analysis. The calculated analysis for $Zn_3L_3(DMF)_2$ is C 56.83%, H 3.89%, N 2.45%; the present material was found to comprise C 56.61%, H 4.39%, and N 2.88%. The molecular crystal structure was found to consist of hexagonal networks composed of trinuclear $Zn_3(CO_2)_6$ units, hereinafter referred to as Secondary Building Units, or "SBU's," connected by trans-stilbene linkers. A cartoon of the overall structure is shown in FIG. 1A.

Figure 1B:
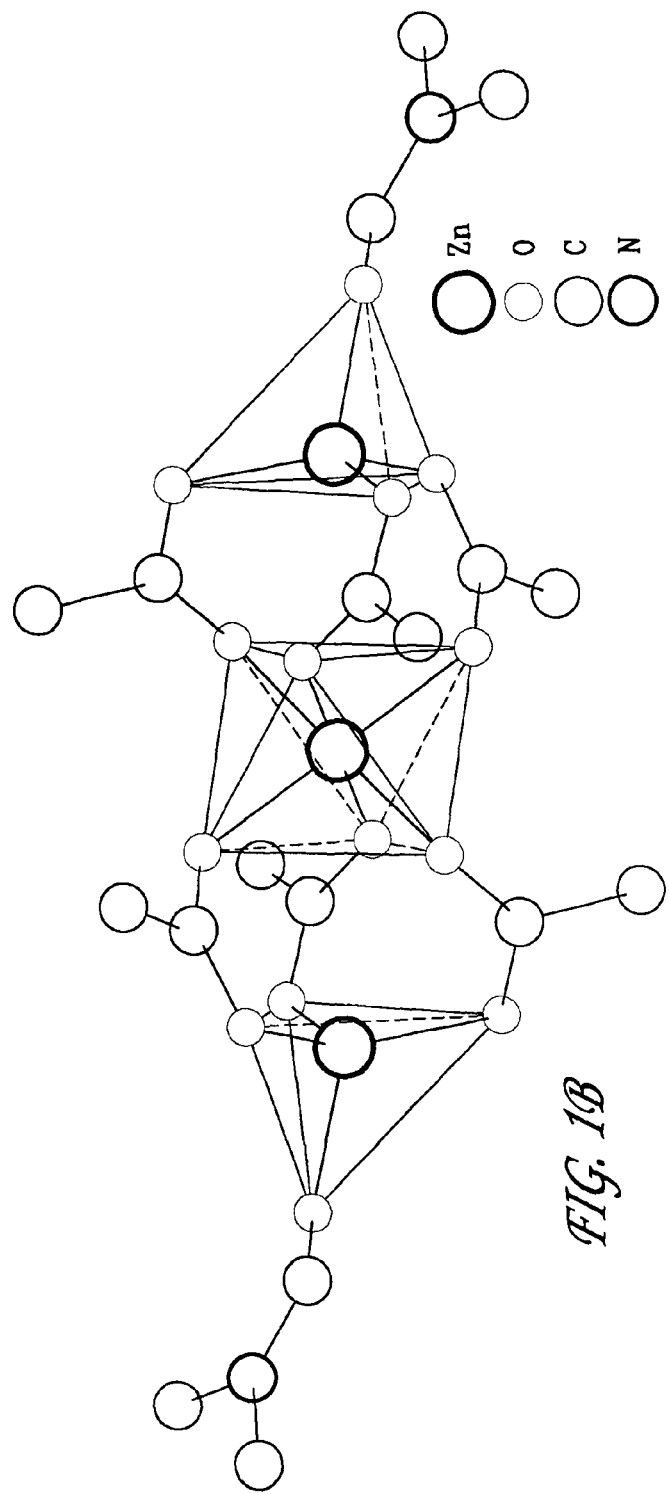
FIG. 1B shows a "stick-and-ball" view of the X-ray determined crystal structure of MOF crystal 1, parallel to the c-axis, showing the $Zn_3(RCO_2)_6(DMF)_2$ secondary building units and the C(4) atoms of the stilbene rings.
Figure 1C:
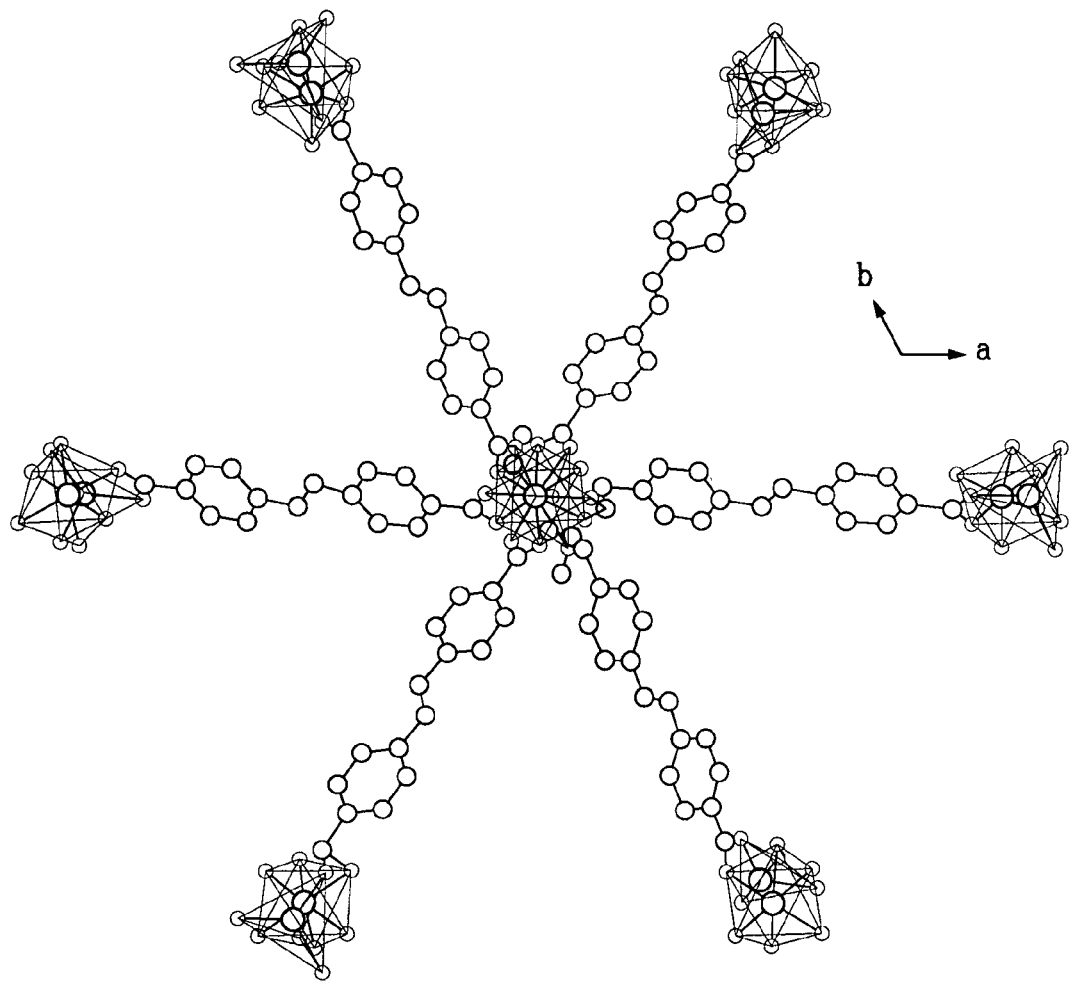
FIG. 1C illustrates a view of the extended network of the MOF structure of crystal 1 looking down onto the MOF secondary building units showing the hexagonal pinwheel connections between adjacent secondary building units made by the stilbene linking units.
Figure 1D:
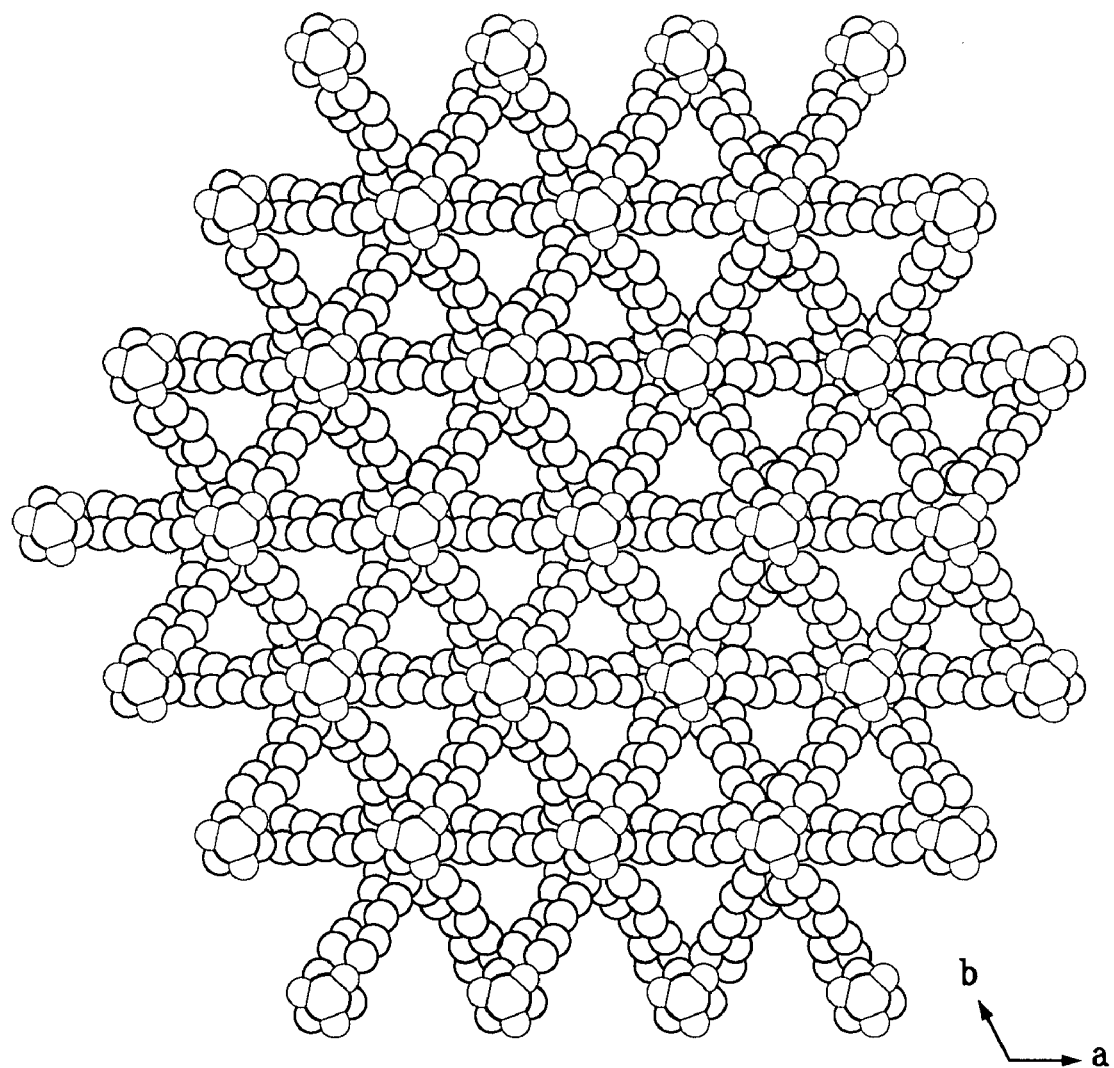
FIG. 1D shows a space-filling model of MOF crystal structure 1 looking down the c-axis of the crystal showing the 2-D network which is formed.

FIG. 1B shows that the SBU contains a linear array of three zinc atoms lying on a 3-fold axis; the central zinc atom rests on a crystallographic inversion center. Carboxylate groups bridge the zinc atoms in a non-planar syn-skew fashion, allowing the stilbene linker to remain planar (torsion angles between phenyl rings)<2°. The central zinc atom has octahedral coordination, while the terminal zinc atoms are tetrahedral; their apical sites are occupied by oxygen atoms of DMF molecules, which themselves exhibit disorder over three possible orientations. The SBUs are connected by linker units in a hexagonal pinwheel geometry, affording a 2-D, layered arrangement (FIGS. 1C and 1D) with disordered DMF filling space above and below the layer units. Individual layers stack together with a cubic ABCABC motif, resulting in a dense structure (d=1.52 g/cm³), without significant overall porosity (i.e. triangular pores visible in FIG. 1D) and are, in fact, partially occupied by the packing of additional layers).

Figure 8:
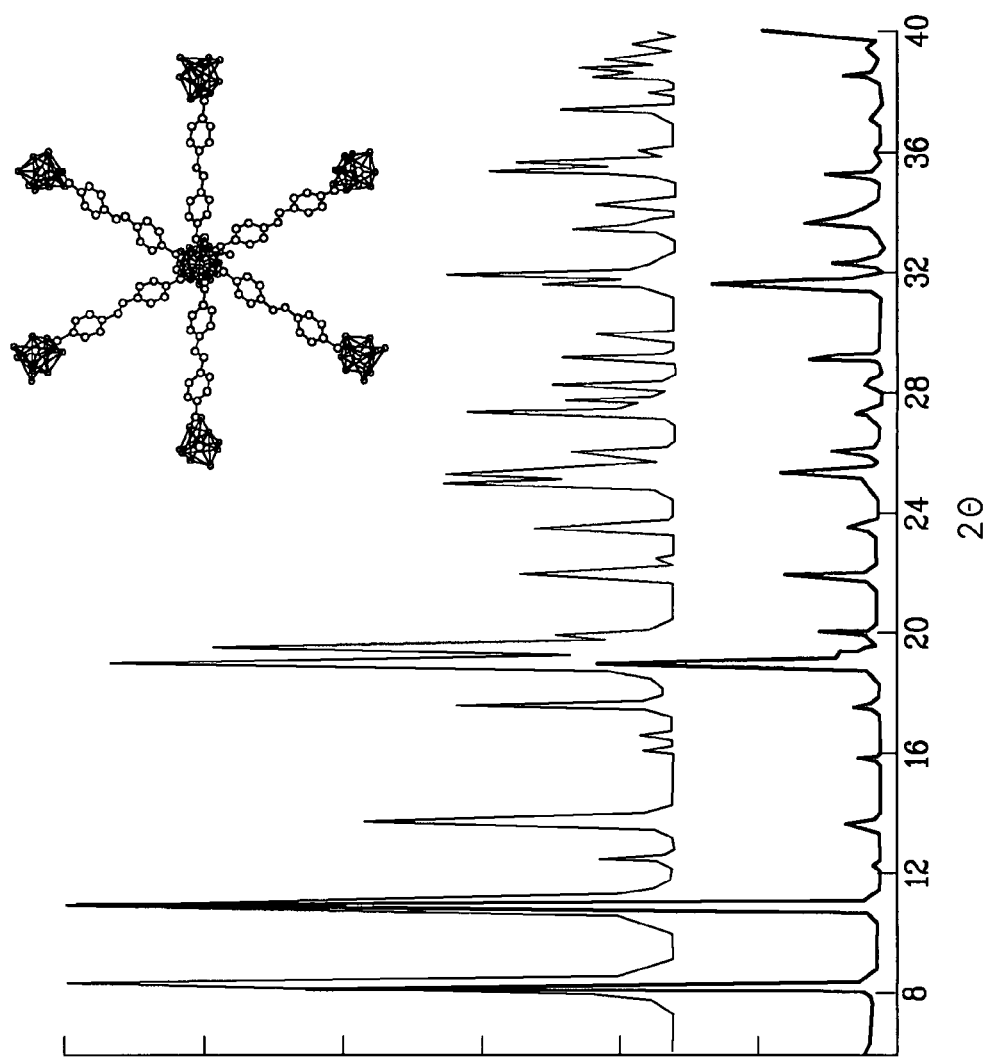
FIG. 8 shows the measured and calculated powder x-ray diffraction patterns of vacuum-dried crystals of 1 (stable upon evacuation).

Crystals of 1 are air-stable and maintain their structure after evacuation at 100° C., as determined by powder XRD and elemental analysis (see FIG. 8). Thermogravimetric analysis (TGA) suggests loss of 2 equivalents of DMF (12.8 wt %) above 250° C., followed by full decomposition at higher temperature. Attempted removal of coordinated DMF by evacuation at 250° C. gives substantial decomposition.

Example 2

A variation of the solvothermal synthesis of crystal 1 was prepared by substituting N,N-diethylformamide (DEF) for DMF as the solvent in the preparation of the to crystals and heating the mixture at 105° C. for 16 hrs to provide colorless, cube-like crystals hereinafter referred to as crystal 2.

In this example, 30.7 mg of $LH_2$ was added to 20 mL DEF in a clean glass beaker and sonicated upon light heating to enable its suspension. 209.2 mg $Zn(NO_3)_2 \cdot 6H_2O$ was added, giving a 6:1 mole ratio of metal to linker, and the beaker sealed (again, other hydrate contents are possible). This was then placed in an oven at 105° C. for 16 hours which yielded the transparent colorless crystals. The excess DEF was decanted while still hot and replaced by DMF. Crystals of 2 were washed with chloroform three times and stored in chloroform until ready for analysis. The calculated analysis for $Zn_4OL_3(DMF)(CHCl_3)$ is C 49.20%, H 3.03%, and N 1.10%; the present material was found to comprise C 49.70%, H 3.24%, and N 1.08%. Yield was 33.8 mg or 70% based on the linker.

Figure 2A:
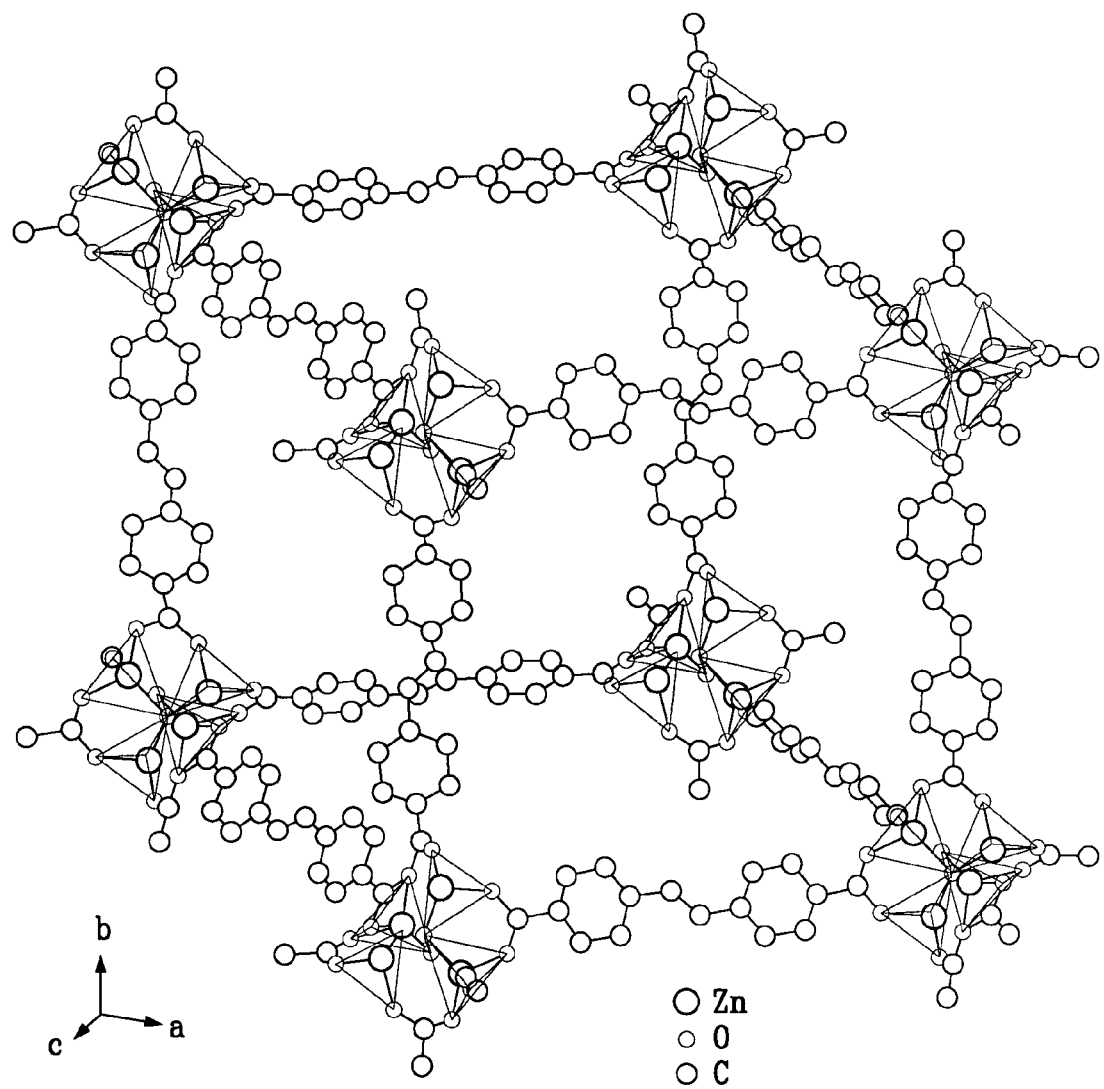
FIG. 2A illustrates an X-ray crystal structure of MOF crystal structure 2 of the current embodiment showing a cubic framework of $Zn_4O(RCO_2)_6$ secondary building units connected by trans-stilbene linkers and green $T_d$ Zn coordination polyhedra.
Figure 2B:
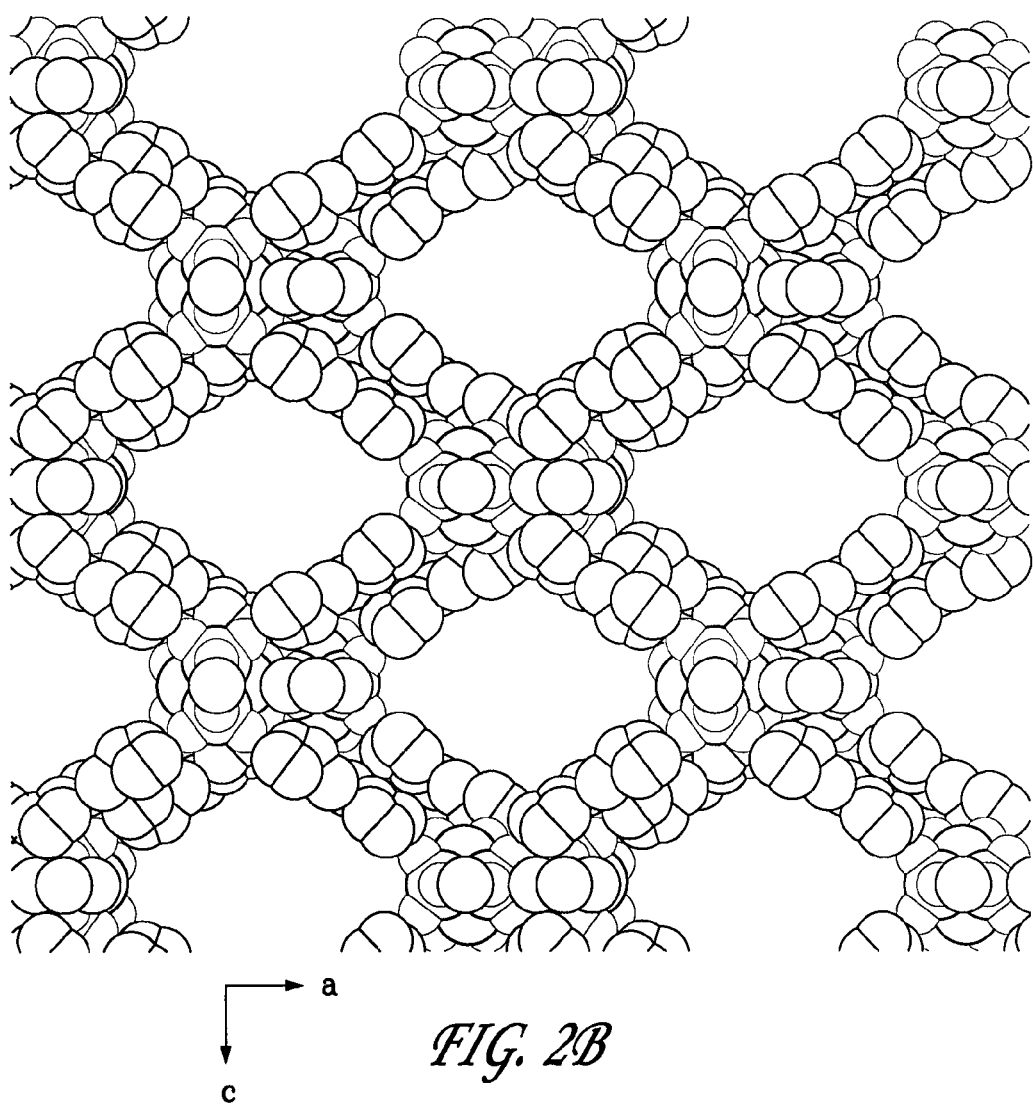
FIG. 2B illustrates a space-filling model showing interpenetrated, porous lattice of two distinct cubic networks (light and dark zinc atoms) of MOF crystal structure 2.

Single-crystal X-ray diffraction revealed these crystals to have a porous 3-D framework structure consisting of two catenated networks of $Zn_4OL_3$ SBUs which exhibit a distorted primitive cubic topology (FIGS. 2A-2B). Each MOF is constructed from basic zinc acetate, $Zn_4O(CO_2)_6$ SBUs bridged in three dimensions by trans-stilbene linkers. FIG. 2A shows this SBU is a cluster with tetrahedral local coordination about each zinc atom; the carboxylate carbon atoms of each cluster serve as points-of-extension that define the vertices of an octahedron. The stilbene units are essentially planar, if slightly more distorted than in crystal 1 (torsion angles between phenyl rings)<5°. This framework structure is analogous to the so-called IRMOF series, all of which are three periodic, cubic-type structures with $Zn_4O(RCO_2)_6$ SBUs. Interestingly, the synthesis of 2 required conditions similar to those reported by Yaghi and co-workers to favor construction of this particular SBU, a compelling illustration that chemical control may be used to produce materials with tunable properties, but similar topologies.

Figure 9:
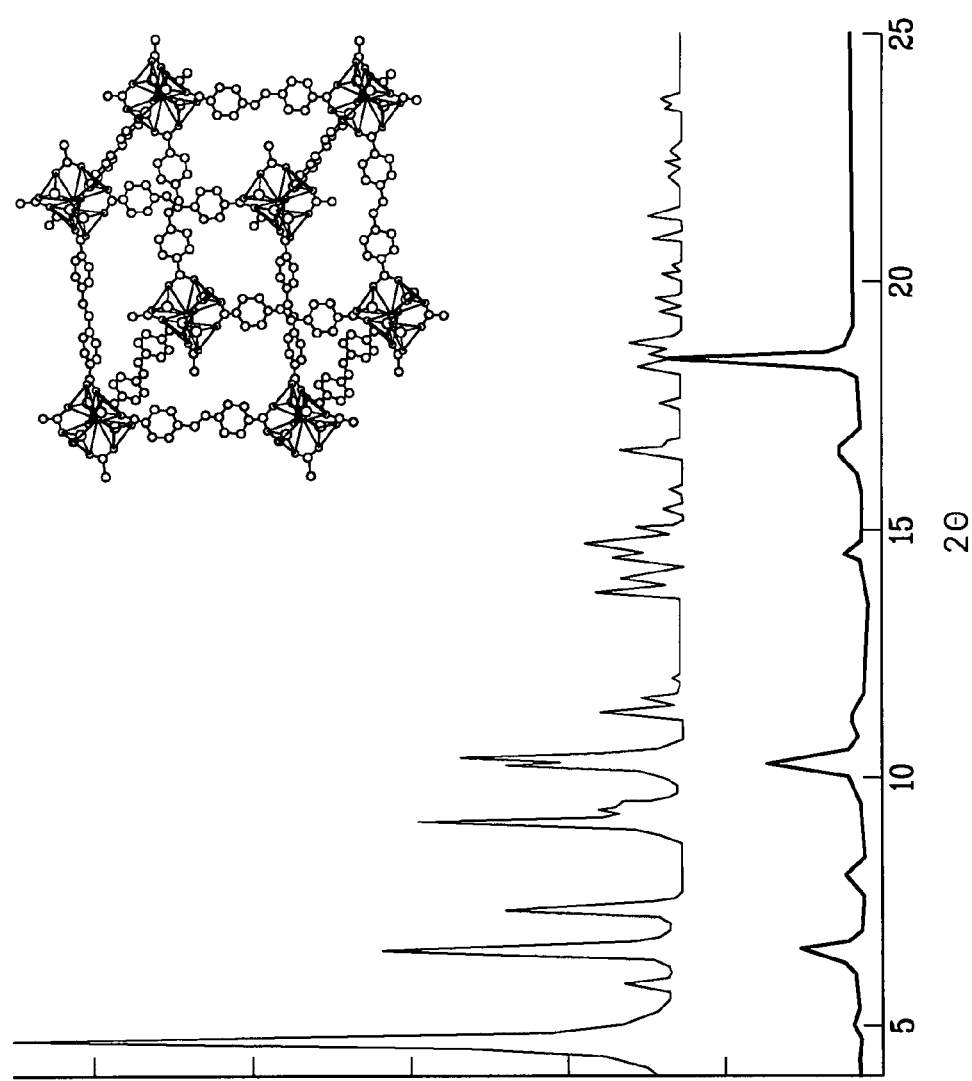
FIG. 9 shows the measured and calculated powder x-ray diffraction patterns of vacuum-dried crystals of 2 which show structural change and loss of crystallinity upon evacuation.

Crystals of 2 contain additional guest solvent molecules; these guests can be exchanged, although full evacuation of crystal 2 results in an irreversible structural change as determined by powder X-ray-diffraction (see FIG. 9). Similar behavior has been found previously for a zinc MOF with comparable, catenated structure (IRMOF-9, whose linker is 4,4'-biphenyldicarboxylate), attributed to weak interactions between catenated units and their misalignment as the solvent is removed. TGA data show that, after mass loss from incorporated solvent in the pores (~15 wt %), crystal 2 is thermally stable up to 410° C. before the onset of decomposition. Although catenation decreases the pore size compared to a fully-open structure, the calculated solvent accessible portion accounts for 76.2% of the crystal volume, with a pore diameter of 16.5 Å and a density of 0.50 g/cm³ (respective values for IRMOF-9 are 74.7%, 14.5 Å and 0.66 g/cm³).

Figure 3:
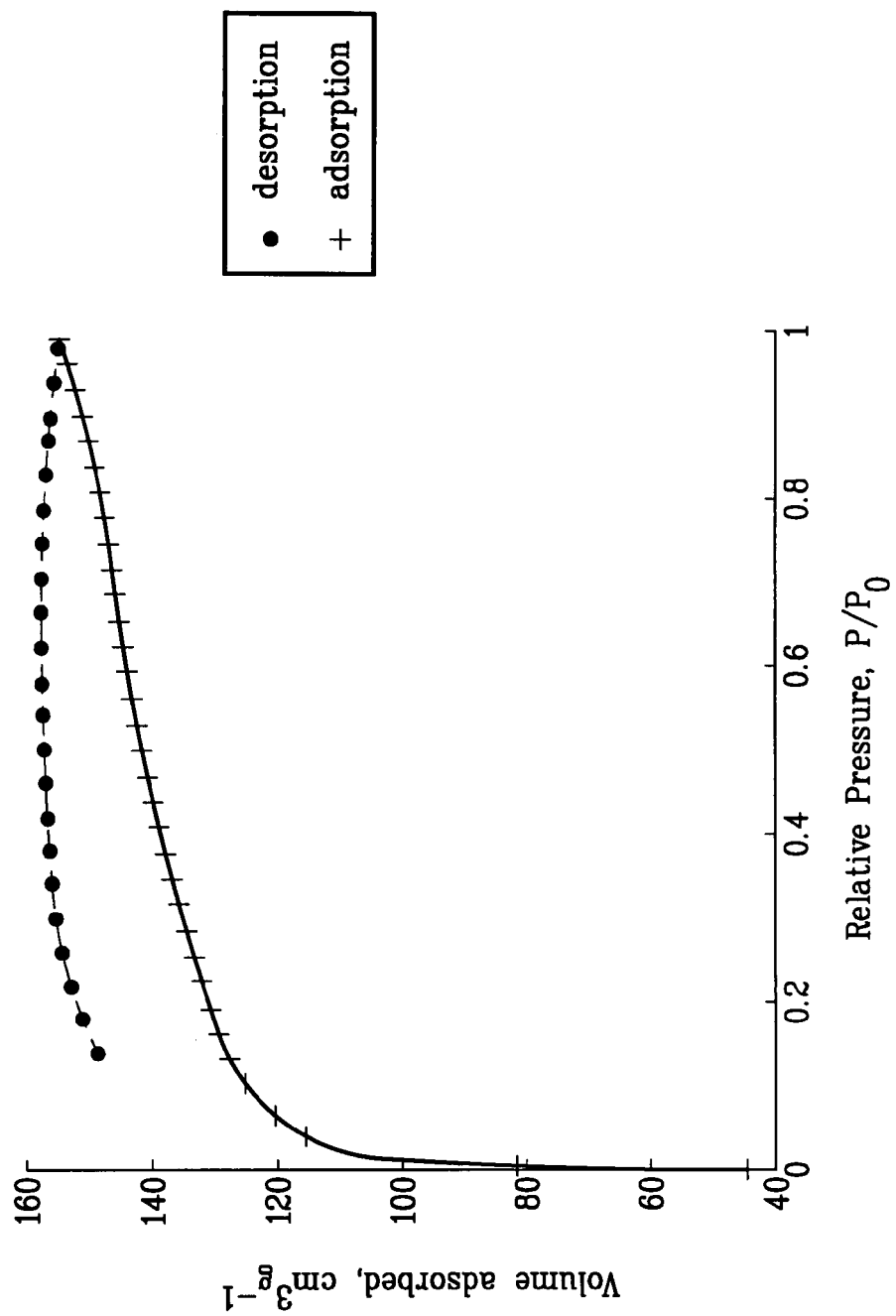
FIG. 3 shows the nitrogen sorption isotherm for 2 measured at 77K. Adsorption is shown as hash marks; desorption as filled circles. The Langmuir surface area is measured to be 580±6 $m^2/g$.

Surface area measurements for crystal 2 exhibit a Type I sorption isotherm (indicative of homogeneous micropores) and a Langmuir surface area of 580 m²/g, a surface area lower than comparable MOF structures (which typically range from 1000 m²/g to 3500 m²/g) due to the structural change upon evacuation. The nitrogen adsorption/desorption profile for crystal 2 also displays significant hysteresis, as shown in FIG. 3, indicating that there may also be a structural change during measurements, possibly due to a change in interaction between the catenated units and/or the linker exhibiting flexibility (e.g. about the to double bond) under these conditions.

Figure 4A:
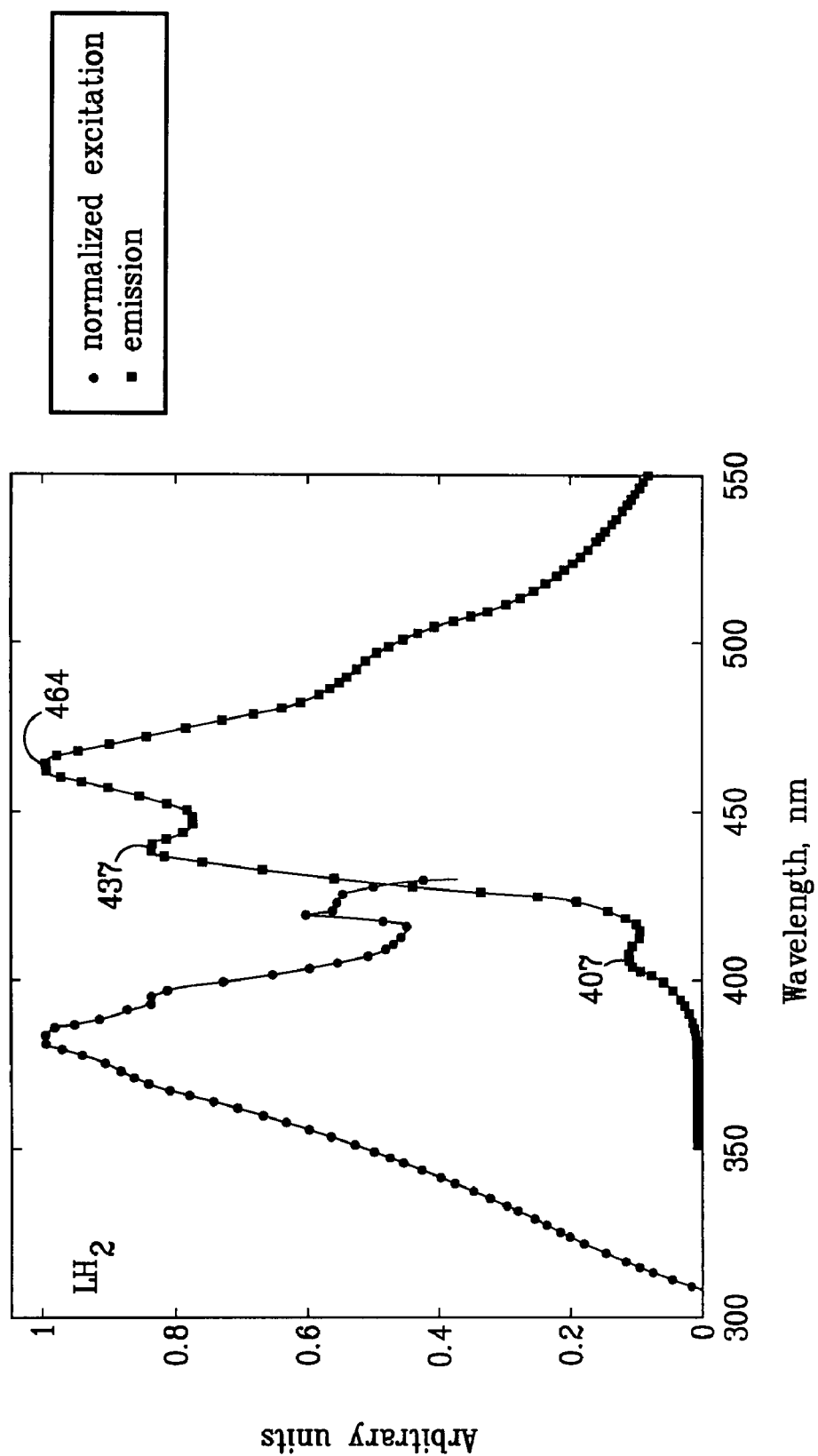
FIG. 4A shows the normalized excitation and emission spectra for $LH_2$ (as a to powder sample) at an excitation wavelength of $\lambda_{ex}$=350 nm.
Figure 4B:
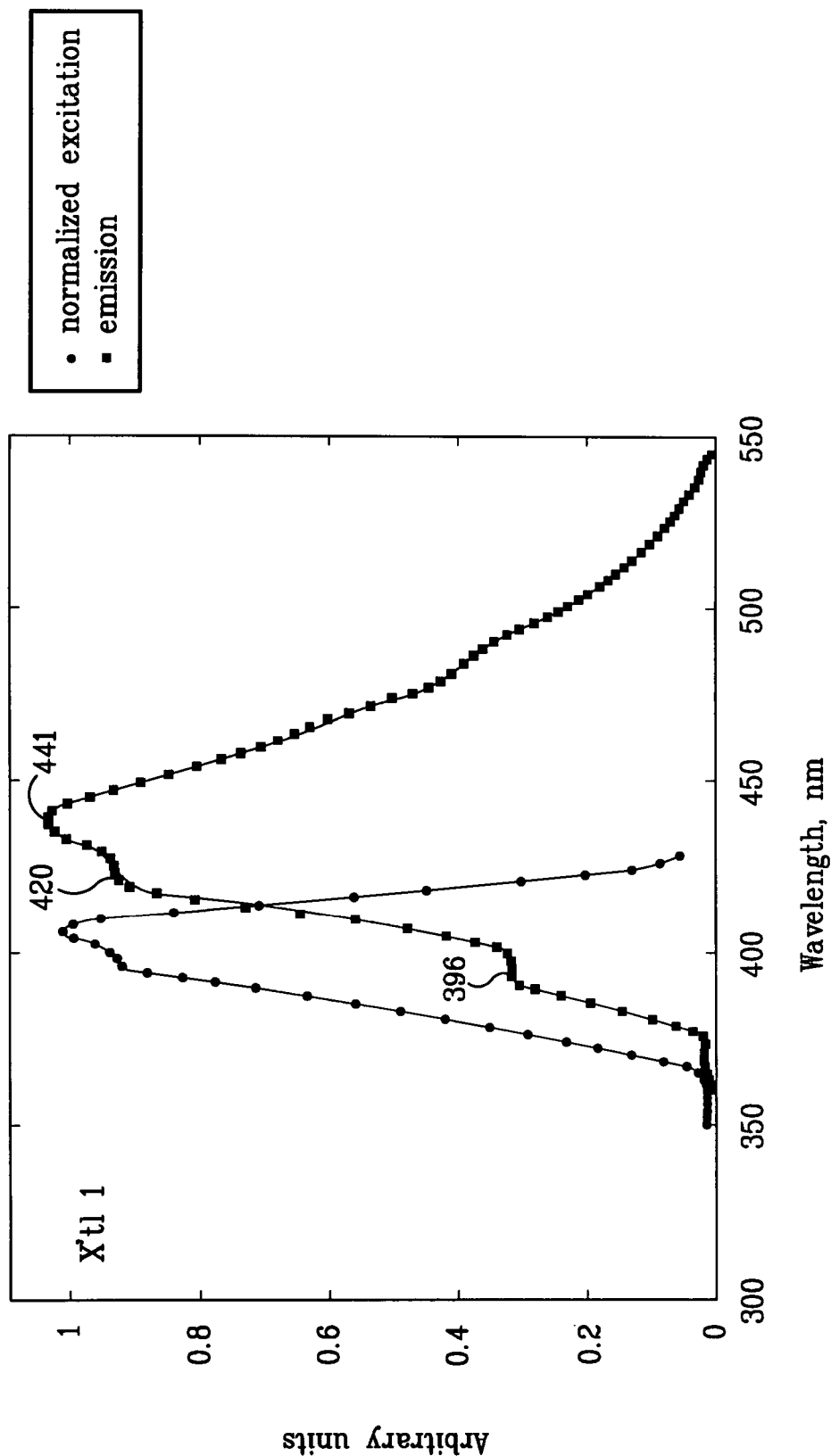
FIG. 4B shows the normalized excitation and emission spectra obtained from individual crystals of crystal 1 soaked in $CHCl_3$ and stimulated with light having a wavelength, $\lambda_{ex}$, of 350 nm.
Figure 4C:
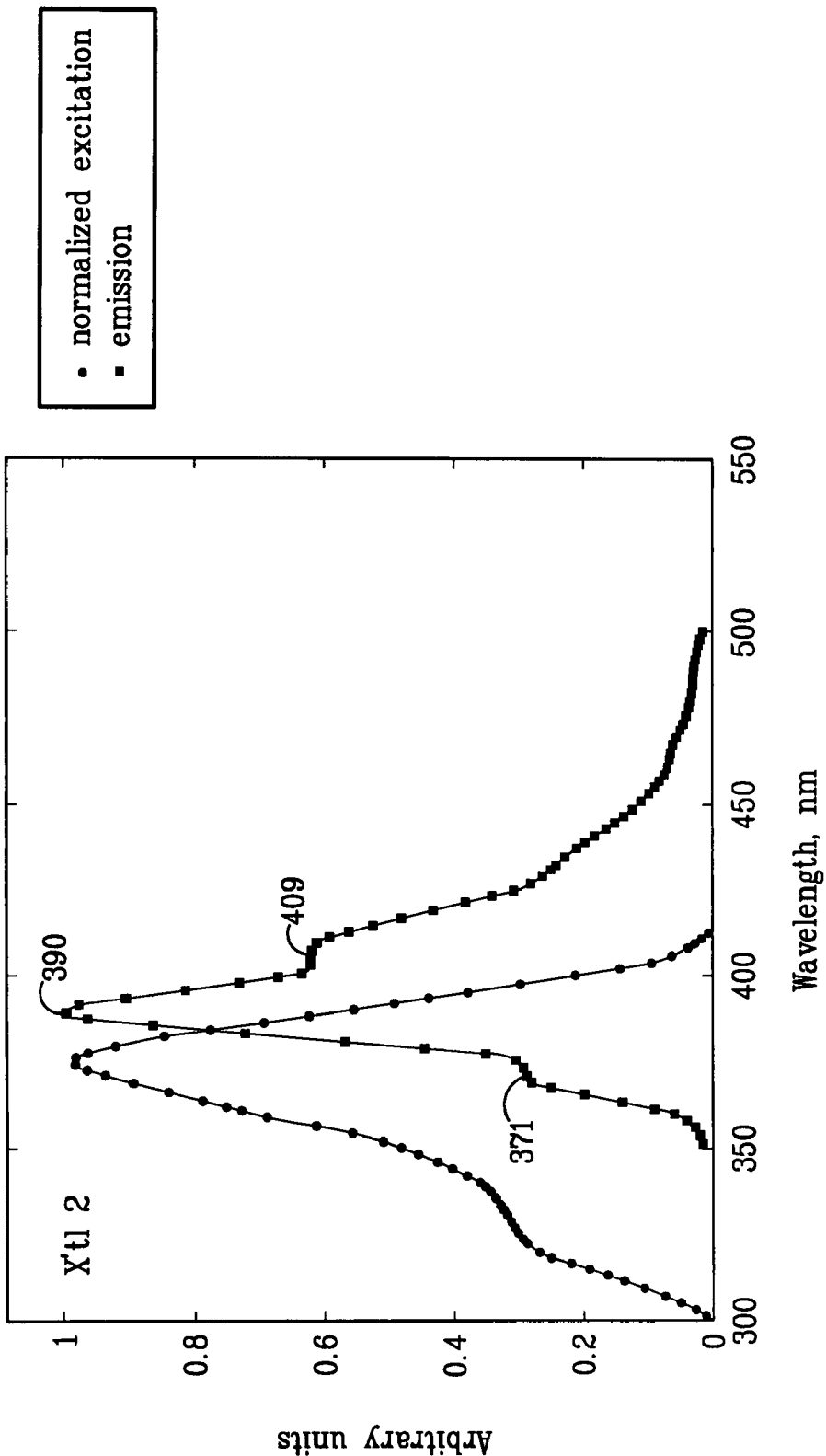
FIG. 4C shows the normalized excitation and emission spectra obtained from individual crystals of crystal 2 soaked in $CHCl_3$ and stimulated with light having a wavelength, $\lambda_{ex}$, of 325 nm.

The photoluminescence of individual crystals of 1 and 2 was also investigated. Crystals 1 and 2 both contain the same linker in two different, well-defined geometries, allowing for a comparative study of their photoluminescence and its correlation to the environment within each structure. Both appear very bright to the eye upon illumination with UV light; but differ in color. Crystals of 1 are yellow in color and produce blue emission, while crystals of 2 are colorless, with purple/blue emission, consistent with their structural differences as outlined below. FIGS. 4A-4C show the combined excitation/emission spectra of crystalline 1 (FIG. 4B) and 2 (FIG. 4C) soaked in chloroform, compared to a powder sample (FIG. 4A) of trans-4,4'-stilbenedicarboxylic acid ($LH_2$) precursor. Crystals of both 1 and 2 show structured emission bands similar to that for $LH_2$, with several vibronic emission bands evident (the first three vibronic bands are indicated on the emission curves for each of the three figures). This indicates that emission is essentially ligand-based, with little contribution from the metal oxide cluster units in the framework, and provides information about inter-chromophore coupling as detailed below. Such behavior differs from that described in the literature for IRMOF-1, whereby it is reported that energy transfer from the relatively non-fluorescent linker (1,4-benzene dicarboxylate) to the $Zn_4O$ units results in a green luminescence from the inorganic cluster. The relative ratios of the emission peaks were found to vary between crystals of 1, yet remained nearly identical amongst many different crystals of 2. We attribute this to the low optical density of colorless crystals of 2, and significantly lower re-absorption compared to crystals of 1, which are more dense and colored. Therefore, solid-state effects on the qualitative spectral features are expected to be minimal.

The fine structure displayed in solid-state electronic spectra of conjugated organic molecules has received a great deal of attention, as analysis can reveal information about the interactions between chromophore units and chromophore rigidity. The intensity of the lowest energy emission peak (0-0) is sensitive to the degree of inter-chromophore coupling, decreasing significantly upon chromophore aggregation. Cofacial arrangements ≦4 Å apart typically show strong intermolecular coupling via π-π overlap, resulting in substantial loss of electronic fine structure. Non-cofacial chromophore assemblies and/or those further apart in space (ca. 4 Å to 8 Å) can show an intermediate degree of coupling, the details of which depend significantly on the geometry of the arrangement. Trap emission in solid PPV films has been attributed to the creation of stilbenoid dimers, which form excimers that give a red-shifted, structureless emission band with a radiative lifetime significantly longer than for the individual chromophore. The vibronic structure in the emission spectra of both crystals 1 and 2 is well resolved, so significant formation of excimers in both crystals can be ruled out. Neither of crystals 1 nor 2 show short cofacial chromophore distances in their crystal structures. The nearest-neighbor distances between aromatic ring centroids and the angles between ring planes are 5.6 Å, 79° (crystals of 1, in an individual layer), 6.0 Å, 0° (crystal 1, between adjacent layers) and 5.6 Å, 49° crystals of (2, between interpenetrated cubes along the edge defined by the b-axis).

The emission spectrum of crystal 2 is similar in both energy and structure to trans-stilbene in dilute solution and in the crystalline state (which has a herringbone packing structure), although for both crystals 1 and 2 the vibrational fine structure is more pronounced. This indicates that the stilbene units are rigidified in crystals of 1 and 2; indeed, this fine structure resembles that for synthetically-locked stilbene derivatives, as discussed in more detail below. In addition, the emission spectrum of crystal 2 is similar to that of the constituent stilbenoid units, indicating these units interact only weakly with one another in this low density 3-D MOF environment. The emission spectrum of crystal 2 is nearly identical in position to dilute solutions of $LH_2$ in dimethylsulfoxide (DMSO) and water (100:1 v/v), suggesting little contribution from the $Zn_4O$ clusters to the emission; the red-shift observed for these species compared to trans-stilbene itself is consistent with the small increase in conjugation due to the carboxylate units. Crystals of 1 show a small red-shift in emission compared to crystals of 2, indicating a greater degree of inter-chromophore coupling in the 2-D MOF structure, likely due to the 6.0 Å distance in the face-to-face stacking of successive layers. However, the extent of this chromophore interaction in crystals of 1 is small compared to $LH_2$, which displays a significantly red-shifted and broadened emission spectrum. Here, presumably, hydrogen bonding between terminal carboxylic acid groups introduces short inter-chromophore stacking distances, as observed for trans-4,4'-stilbene diamides which show emission spectra characteristic of edge-to-face dimers (5.0 Å between phenyl ring centroids, 28° between ring planes).

The Stokes shifts apparent for both crystals 1 and 2 are significantly smaller than for dilute solutions of trans-stilbene (~3400 $cm^{-1}$ in dioxane), and this shift is smallest for crystals of 2 (815 $cm^{-1}$ in the case of 2 versus 1215 $cm^{-1}$ in the case of 1). These data indicate the degree of reorganization between the ground and first excited states of crystals 1 and 2 is reduced compared to trans-stilbene in solution. This is likely due to increased rigidity of the stilbenoid unit afforded through strong coordination by the metal ions in the framework, which results in a larger barrier for torsion about the central ethylene bond.

Time-resolved emission measurements were used to probe further the local environment of stilbenoid units in crystals of 1 and 2. The radiative lifetime of trans-stilbene (τ) is estimated to be 1.7 ns, which typically becomes shortened to τ<100 ps in solution at room temperature. The major factor contributing to the reduced lifetime is the trans-cis isomerization. These isomers are nearly isoenergetic in the ground state, but a large barrier to rotation exists and the trans-state acts as a quantum well. Excitation to the first excited-singlet state is followed by barrier-free rotation about the central double bond, leading to the essentially non-fluorescent cis-isomer, which can give additional photoproducts, including cyclization to dihydrophenanthrene. This photoisomerization quantum yield (QY) is significantly larger than the fluorescence quantum yield at room temperature ($\theta_{P.I.}$=0.45 vs. $\theta_{EM}$=0.02 in acetonitrile).

Figure 5A:
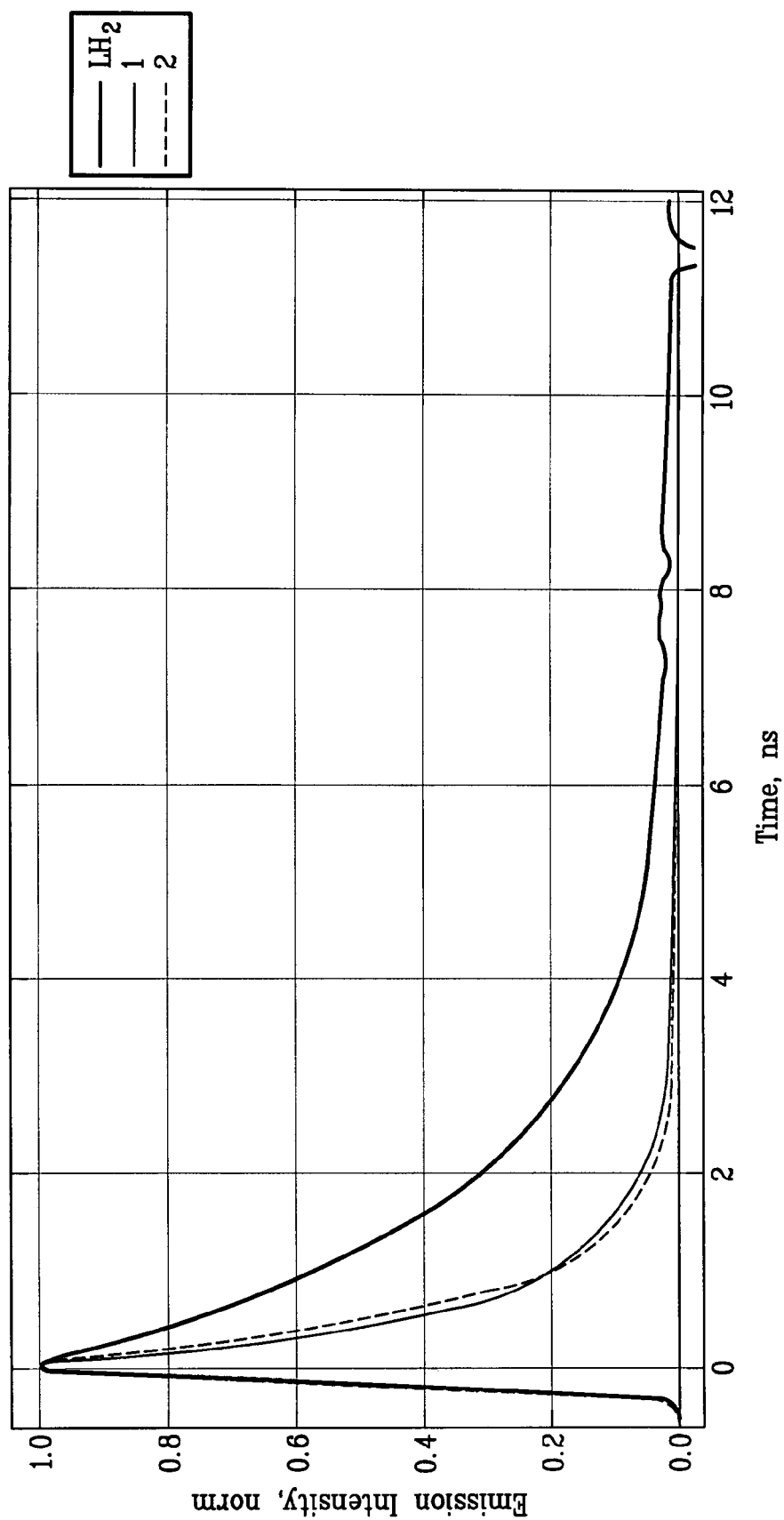
FIG. 5A illustrates the emission decays of crystals 1 and 2, and $LH_2$ wherein each decay curve was detected at the respective third vibronic peaks, i.e., 409, 441, and 464 nm, of FIGS. 4A-4C.
Figure 5B:
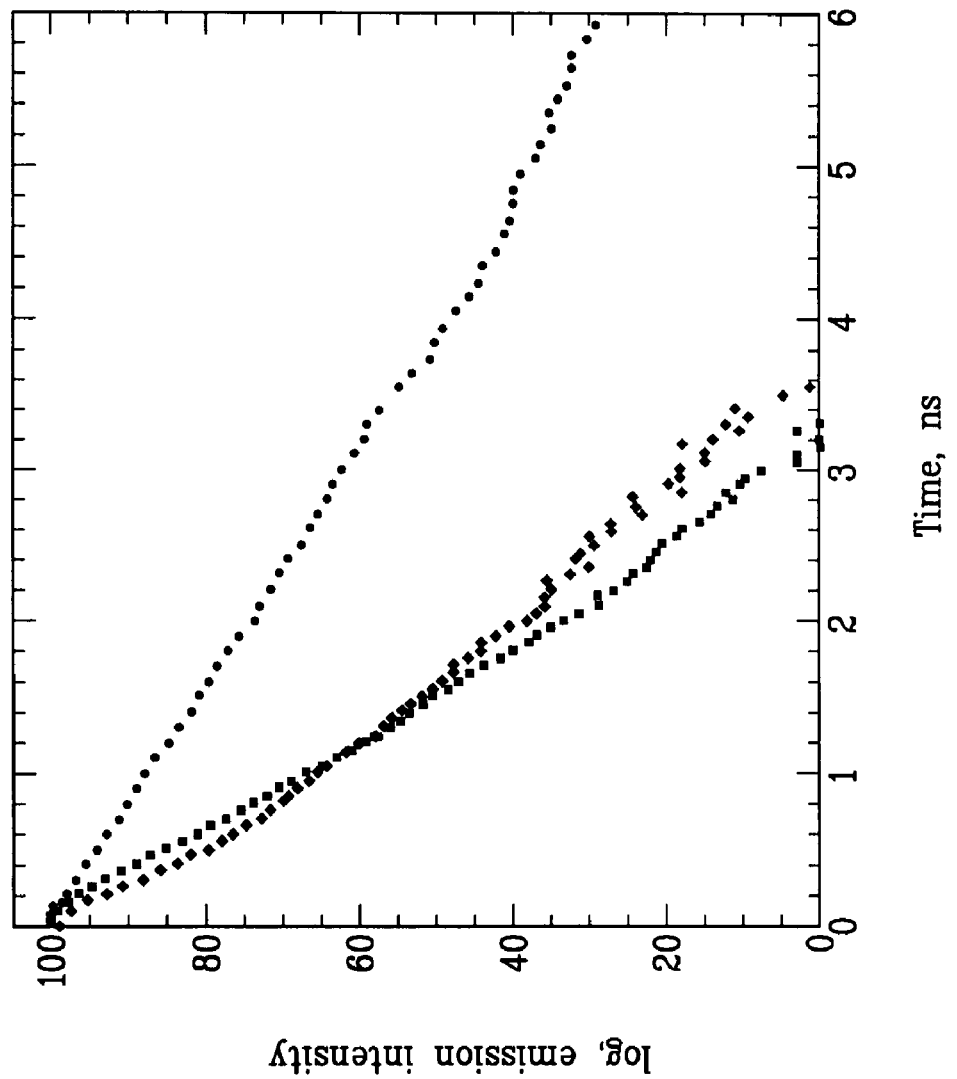
FIG. 5B illustrates the logarithmic emission decay plots of FIG. 5A.
Figure 6A:
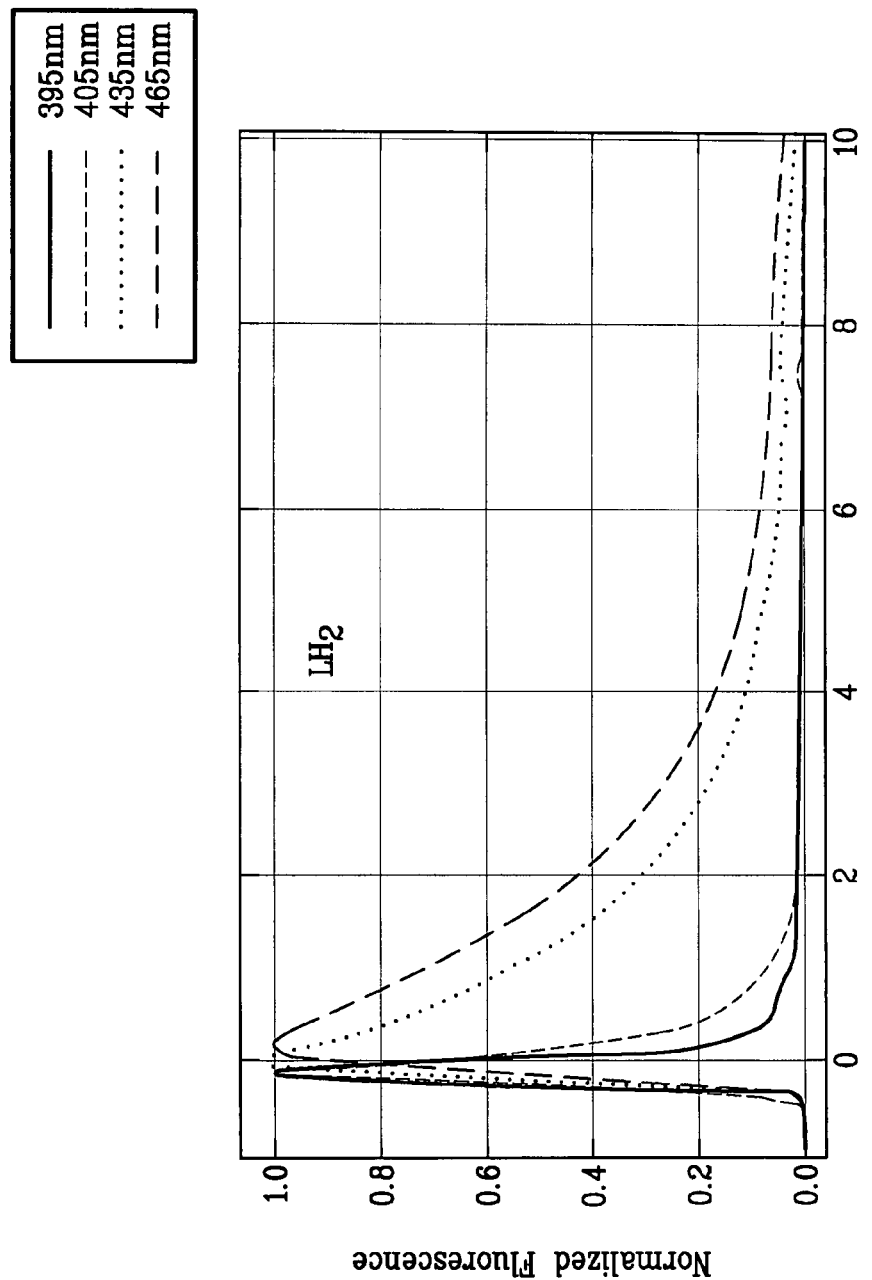
FIG. 6A shows emission decay for $LH_2$ at various detection wavelengths, wherein the growth of long-lived emission at lower energies is very pronounced due to significant interchromophore coupling.
Figure 6B:
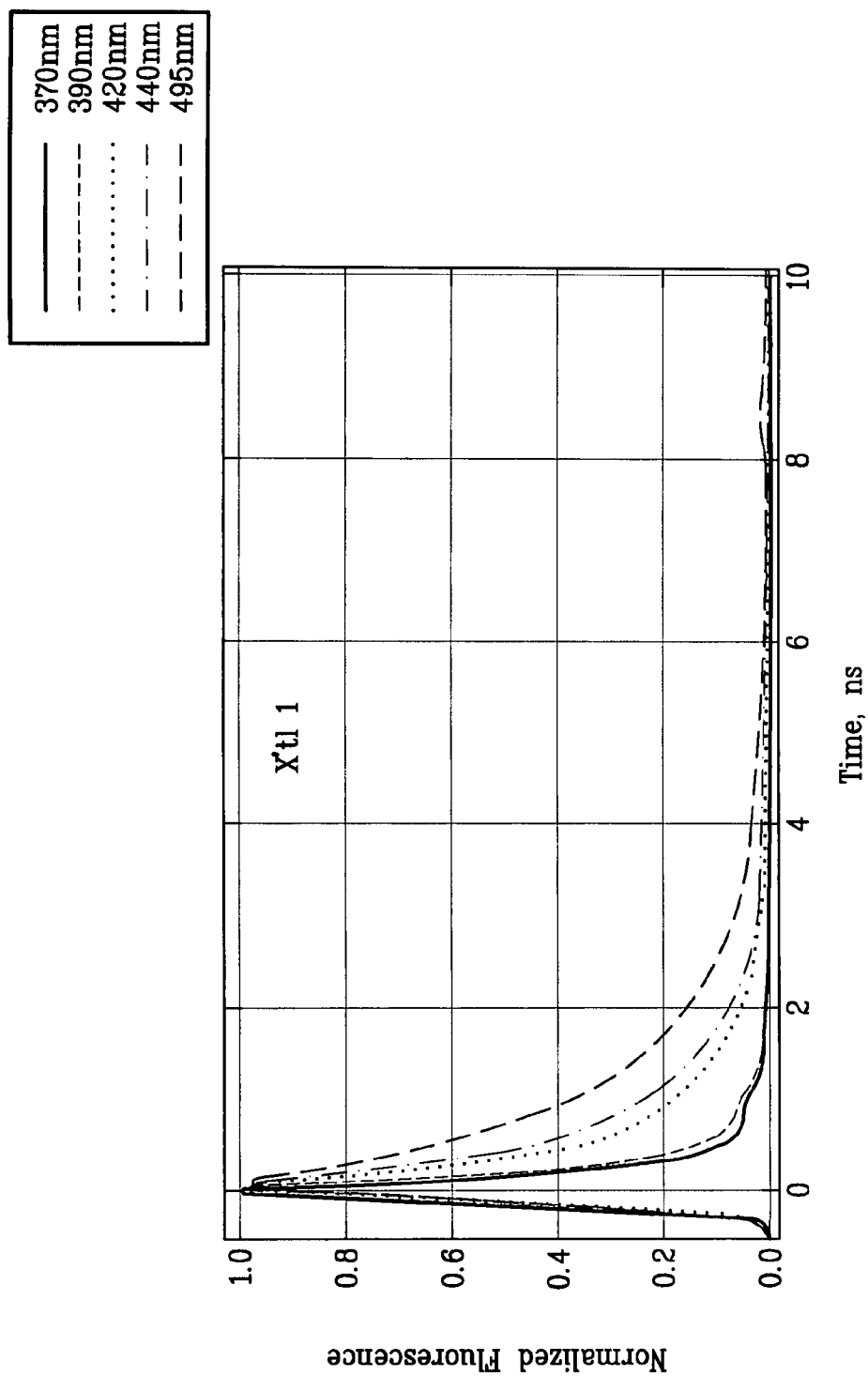
FIG. 6B shows emission decay for crystal 1 at various detection wavelengths, wherein the growth of long-lived emission at lower energies is present but much less pronounced than for $LH_2$.
Figure 6C:
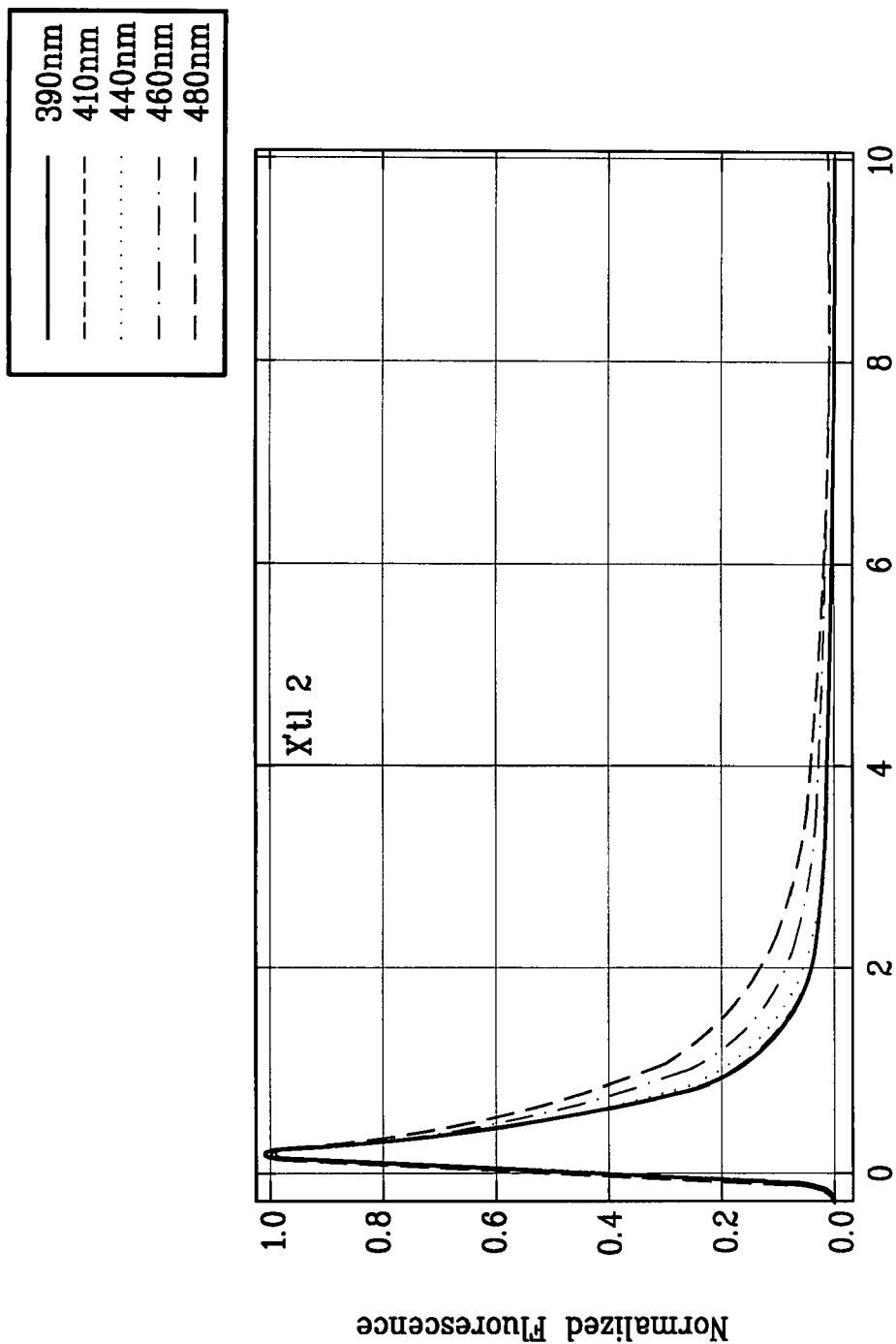
FIG. 6C shows emission decay for crystal 2 at various detection wavelengths, wherein the growth of long-lived emission is negligible.

Typical emission decay curves for crystals of 1 and 2 and of $LH_2$ powder are shown in FIG. 5A. The decay curve for crystals of 1 was found to be best fitted by a bi-exponential function. Emission lifetimes (τ) were determined by fitting the decays to a single or double exponential function: $I(t)=\alpha_1 e^{-t/\tau_1}+\alpha_2 e^{-t/\tau_2}$ where α is the pre-exponential factor, and t is the decay time. Both crystal 1 and $LH_2$ were best fit to bi-exponentials, as supported by the logarithmic plots shown in FIG. 5B, where the presence of more than one decay time results in curvature of these spectra. The faster component has τ ~0.20 ns, likely due to emission from monomeric stilbenoid units. The relative contribution of the longer-lived species was found to increase upon increasing the detection wavelength, which is accompanied by a delay in fluorescence, indicating an excited-state activated process. Both the decay and growth of a decay component with longer lifetime at lower emission energy is indicative of an excited state electron transfer event(s), and is likely due to interactions between individual chromophores in crystal 1. Consistent with this, $LH_2$ powder samples show significantly more pronounced behavior in this regard due to much stronger inter-chromophore coupling (see FIG. 6A). This behavior is also seen for crystals of 1, but to a lesser extent (FIG. 6B), while the effect is negligible for crystals of 2 (FIG. 6C).

In contrast, emission decays for crystals of 2 (in a chloroform environment, also shown in FIGS. 5A and 5B) were best fitted by a simple exponential function resulting in a linear logarithmic plot with τ=0.50 ns, and were attributed to emission from stilbenoid monomers. The measured lifetime is approximately five times greater than for trans-stilbene in solution, consistent with an increased rigidity of coordinated stilbenoid chromophores in crystal 2. Typically, increased lifetimes accompany an increase in emission QYs, which are expected to be larger for both crystals 1 and 2 than for trans-stilbene in solution. However, values were not determined in this study as variations in crystal size and shape can introduce significant uncertainties into the measurements.

The increase in the luminescence lifetime for crystals of 2 is expected when considering the strong coordination to the $Zn_4O$ units in the crystals. However, this lifetime is shorter than that of "chemically"-frozen and highly-rigidified states shown previously, indicating that the structure is not extremely rigid, and thus, non-radiative pathways are not completely suppressed. We and others recently addressed the flexibility of MOF-type structures by theoretical means. Molecular dynamics simulations using a newly developed non-rigid force-field indicate that there is considerable motion of the linker groups in IRMOF-1 ($Zn_4O(1,4$-benzene dicarboxylate$)_3$) at room temperature. In addition, Mattesini et al. ("Ab initio study of metal-organic framework-5 $Zn_4O$ (1,4-benzenedicarboxylate): An assessment of mechanical and spectroscopic properties," *Physical Review B*, 2006, 73(9), pp. 094111) have used plane-wave density function theory to predict the elastic properties of IRMOF-1 and concluded that, contrary to what was originally thought for this archetypal isoreticular structure, IRMOF-1 is actually not an exceptionally rigid material. Instead, the calculations predict it to be a soft and ductile material, with a Young's modulus of 14.8 GPa. Most recently, it was shown that lattice motions need be included to accurately simulate molecular transport in IRMOF-1. By analogy with these results, the porous stilbene-containing structure of crystal 2 (with a longer and less-rigid ligand than IRMOF-1) is expected to provide an environment with increased rigidity and isolation of ligands, yet flexibility for active interaction with guests incorporated into the open framework.

Figure 7A:
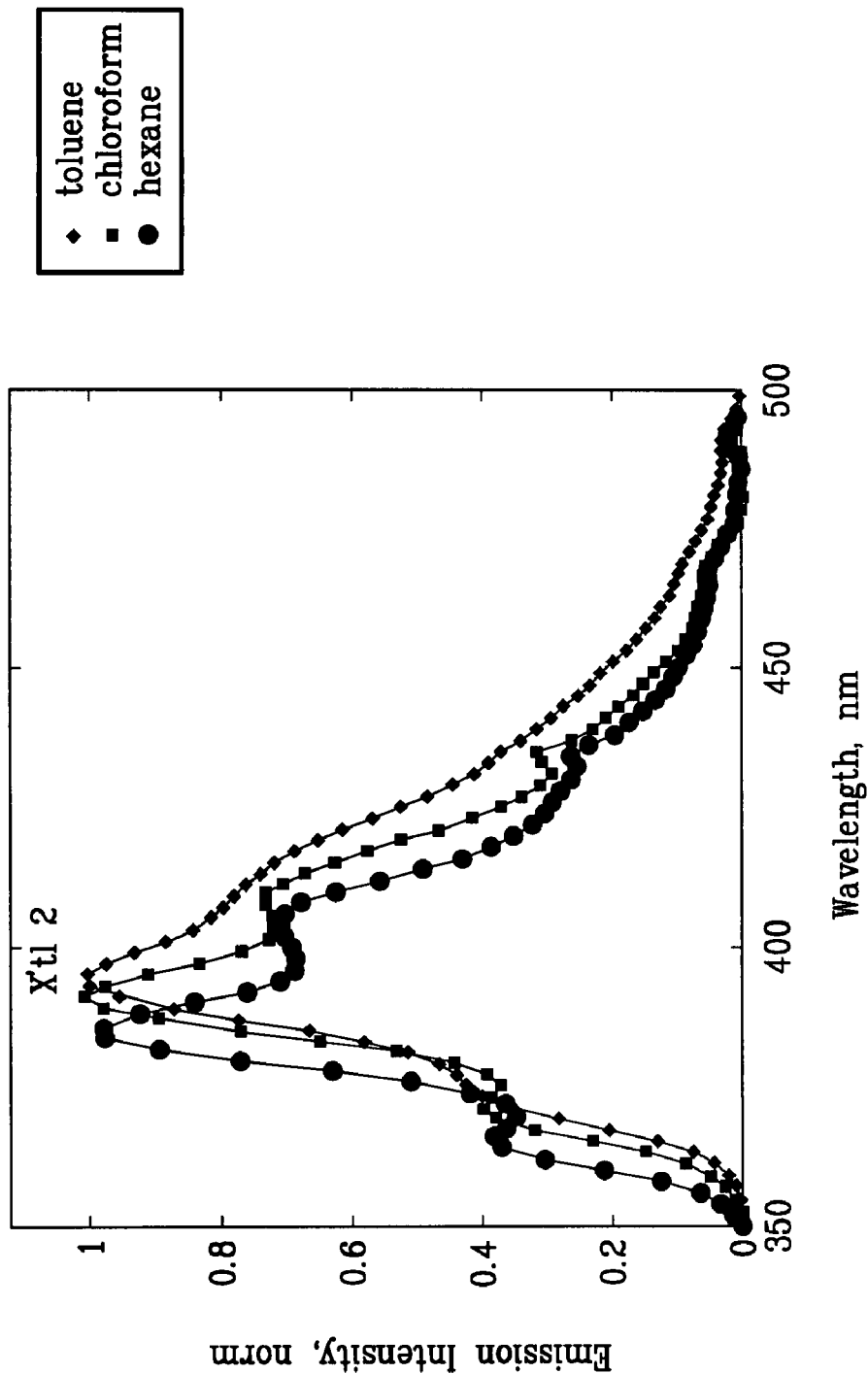
FIG. 7A illustrates the normalized solvent-dependent emission spectra from a crystal of the second MOF soaked in toluene, chloroform, and hexane. The crystals were found to be fully reversible upon solvent exchange.
Figure 7B:
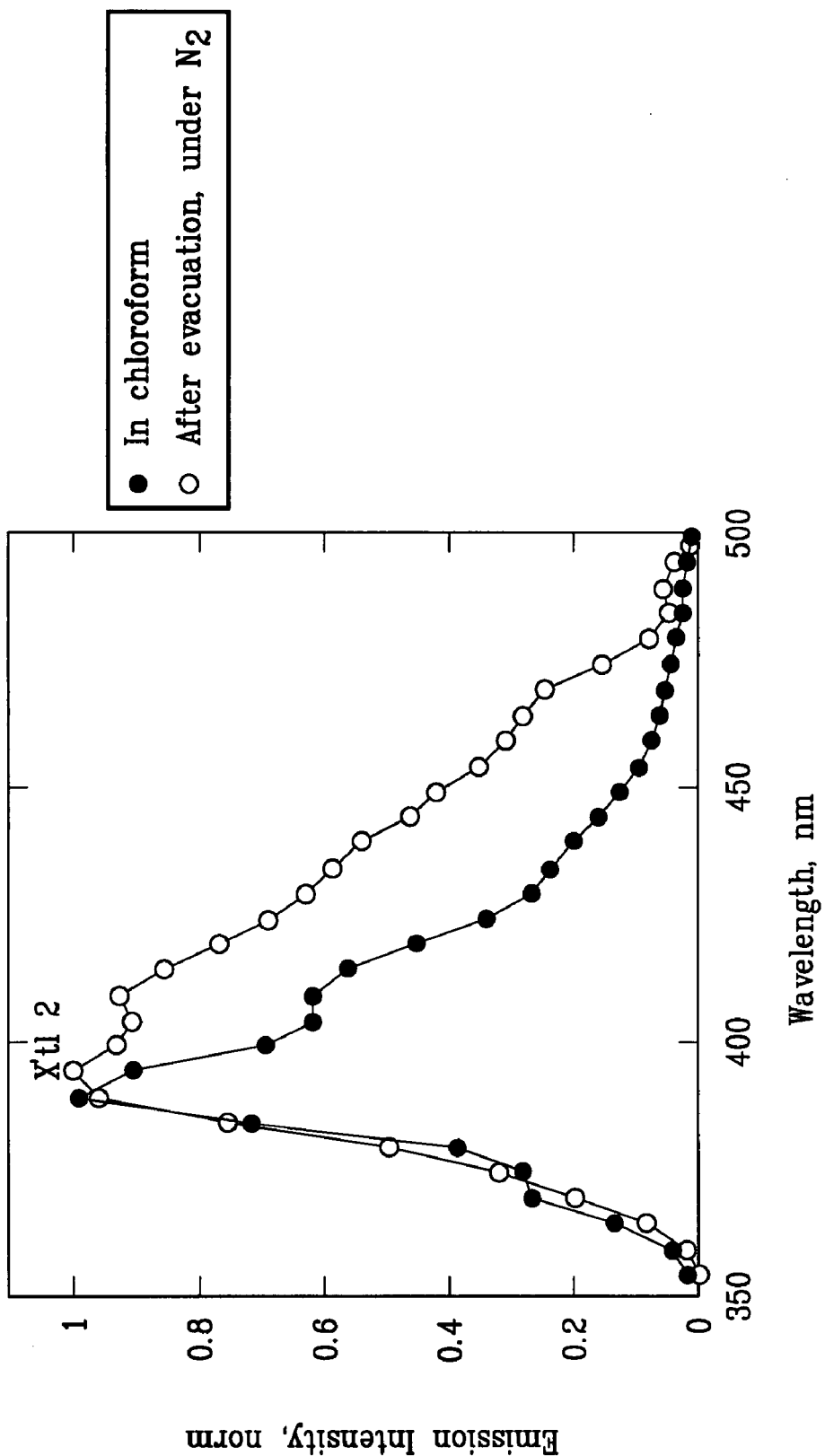
FIG. 7B shows crystals of 2 in chloroform (filled circles) and crystals of 2 after extended evacuation, under nitrogen (open circles) illustrating that the original spectrum cannot be fully regenerated upon rewetting the evacuated MOF structure in chloroform, due, presumably, to a partial structural collapse in the crystal upon evacuation.

To investigate the effects of guest molecule incorporation, the emission spectra of crystals 1 and 2 were recorded after exposure to different solvents. Crystal 1 exhibits no change in emission upon changing solvent environment, and likewise shows no significant difference after drying for extended periods under vacuum. This is likely a function of the dense, rigid structure of crystal 1, wherein the majority of chromophores are not exposed to the solvent. In contrast, the luminescence from crystals of 2 is sensitive to solvent exchange. Shifts in emission were observed upon changing solvent, with peak maxima decreasing in energy in the order hexane>chloroform>toluene, alongside a broadening of the vibronic structure as shown in FIG. 7A. This response was found to be fully reversible through multiple cycles of exchanges between the different solvents. However, upon complete removal of incorporated solvent in vacuo, crystals of 2 in chloroform display a significant, irreversible red-shift in emission, as shown in FIG. 7B. This behavior is likely ascribable to a permanent structural change which brings the stilbenoid linker units in closer proximity to one another, and provides evidence for the structural collapse of interpenetrated units upon evacuation as hypothesized above, resulting in the lower-than-expected surface areas discussed previously. These results also indicate that the dynamic nature of the lattice of crystal 2 could allow for specific guest-host interactions with this linker, which may have potential application in combined separation and detection experiments.

Figure 10A:
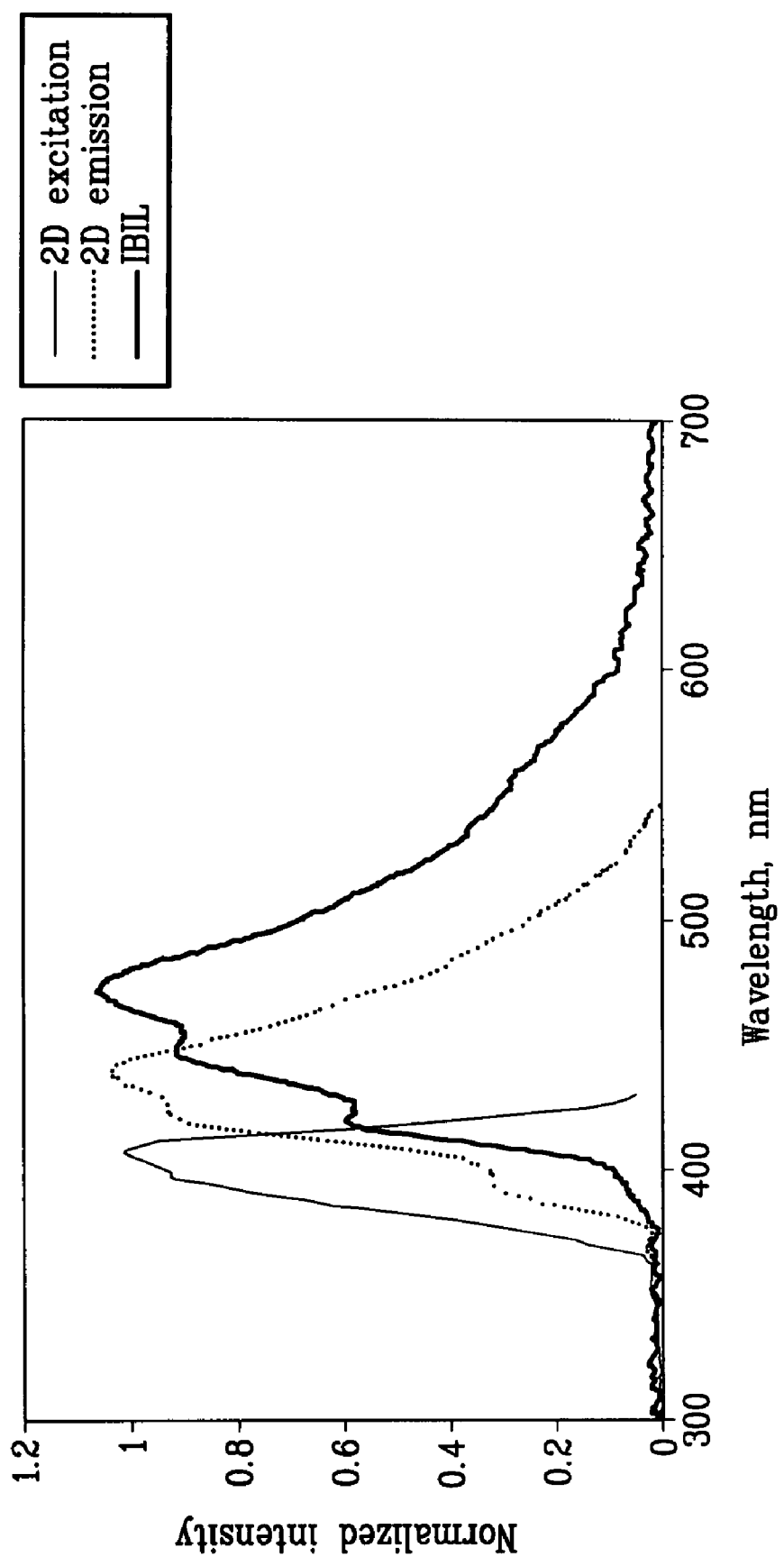
FIGS. 10A and 10B show normalized light spectra for light excitation and emission and for ion (proton) beam induced luminescence (IBIL) for crystals 1 and 2
Figure 10B:
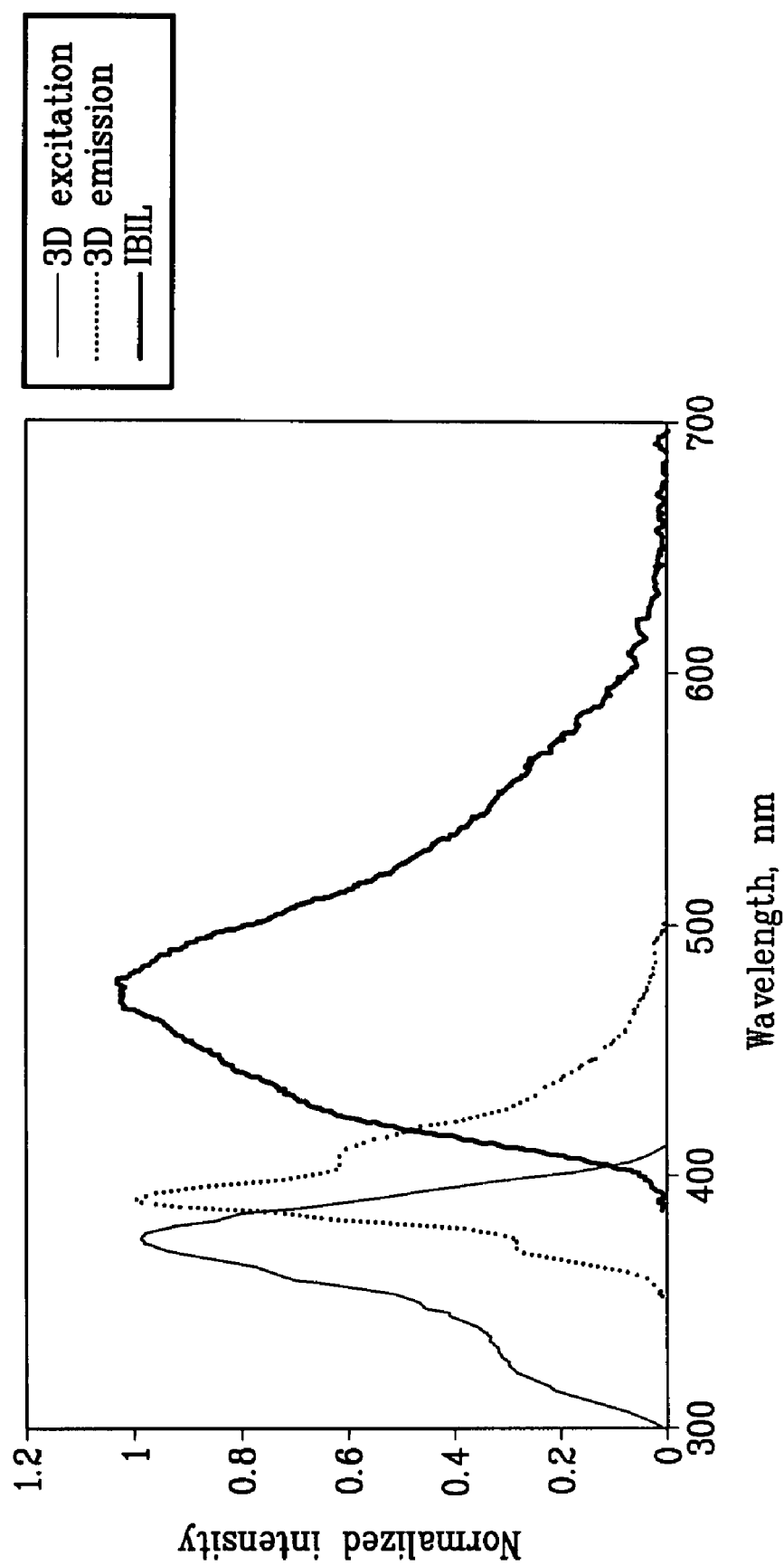
Figure 11:
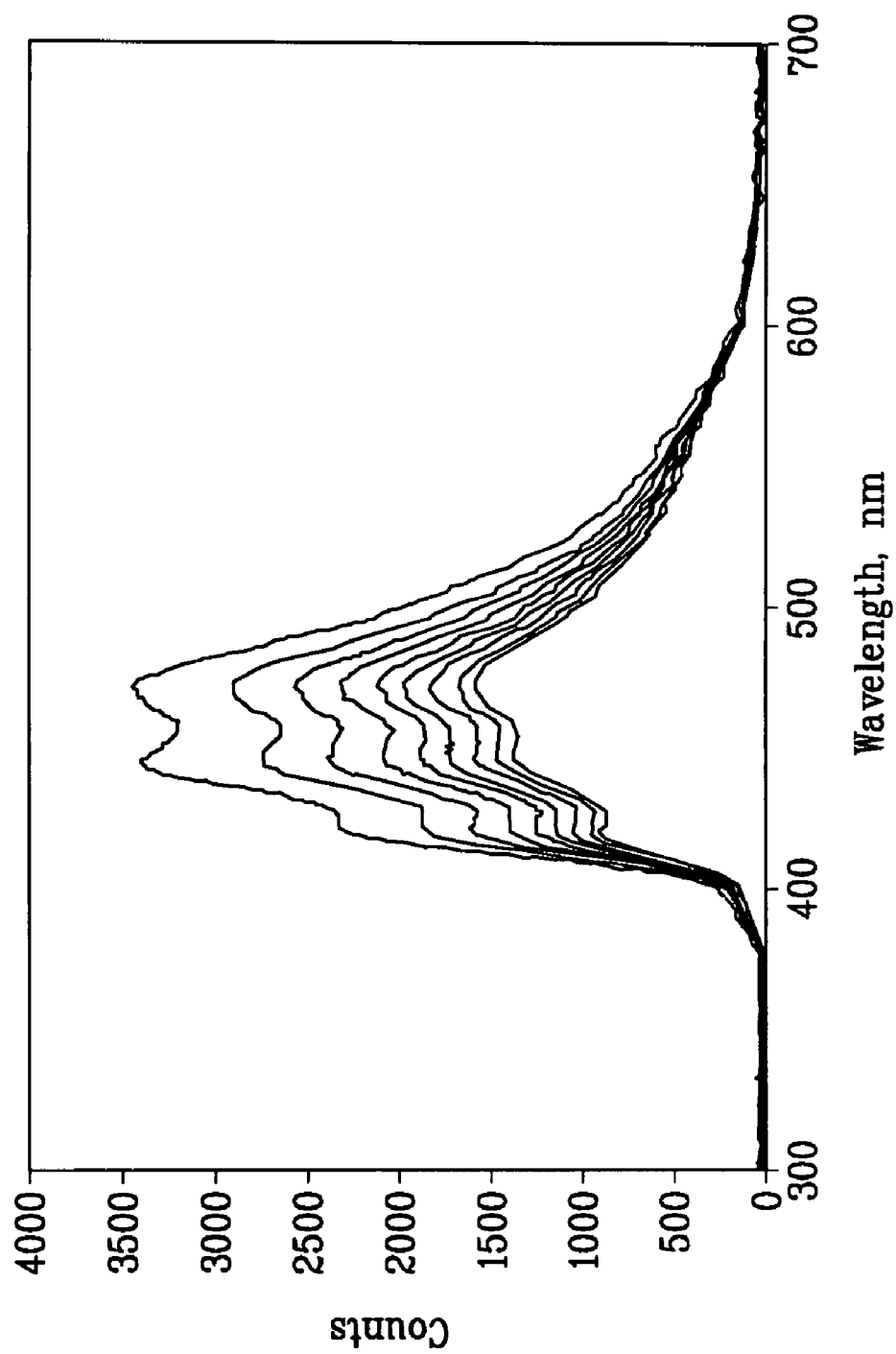
FIG. 11 shows a series of radiation induced luminescence spectra, taken at 2-second intervals, as crystals of 1 are exposed to a proton beam with an energy of 3 MeV at an absorbed proton dose rate of $5\times10^6$ rad/s.
Figure 12:
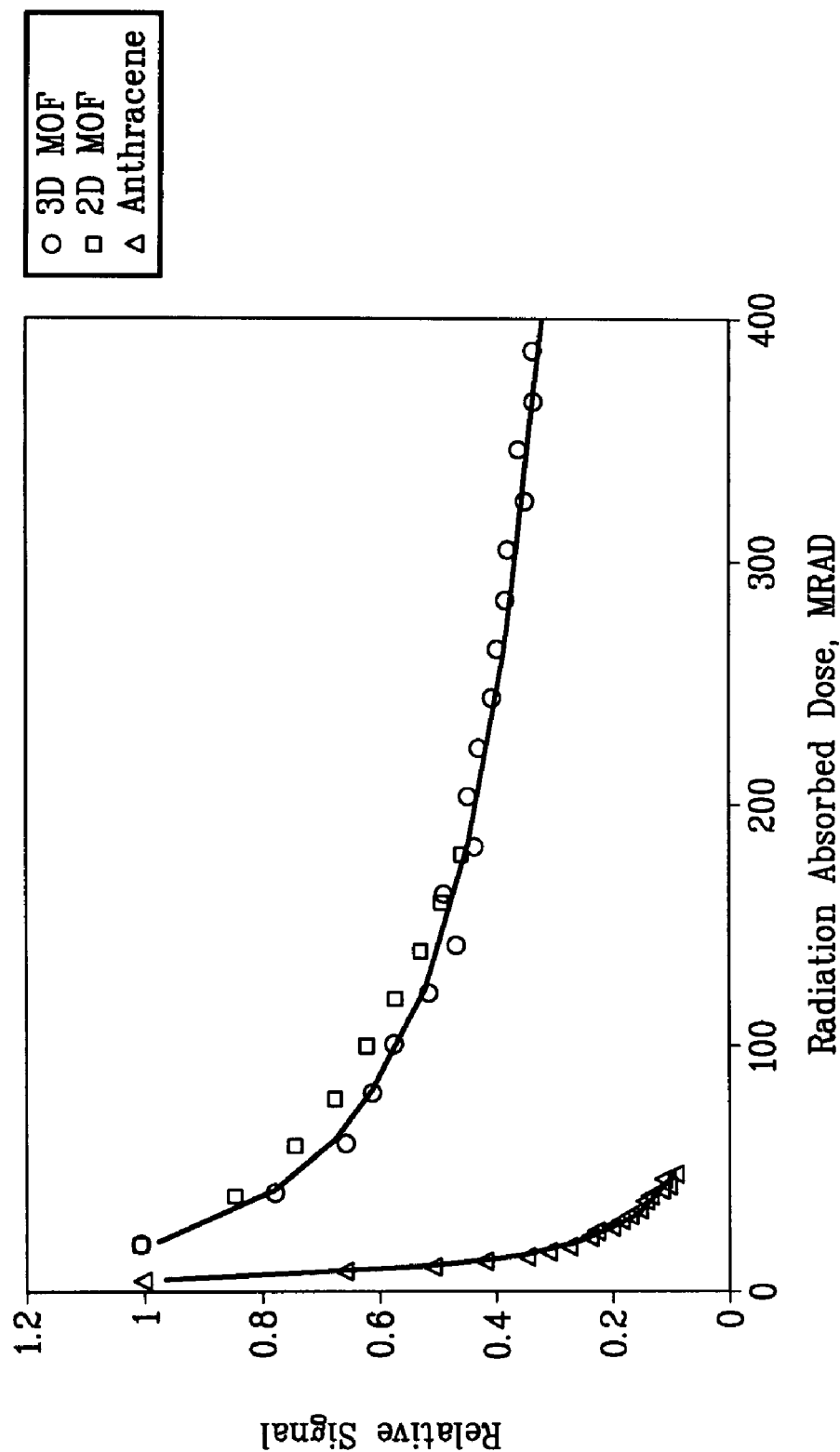
FIG. 12 shows the peak intensity data crystals of 1 and 2 and an anthracene standard fit to a stretched exponential function.

In order to demonstrate the radioluminescent behavior of crystals 1 and 2 these materials were subjected to an intense 3 MeV proton beam and their light spectra measured. FIGS. 10A and 10B show normalized light spectra for light excitation and emission and for ion (proton) beam induced luminescence (IBIL) for crystals 1 and 2. Both crystals clearly generate a strong luminescent signal when exposed to the proton source. Furthermore, FIG. 11 illustrates the spectra of crystal 1, measured every 2 seconds, as the material is exposed to the proton beam described above. The radiation dose absorbed by the crystals during each interval is $10 \times 10^6$ Rads. Similar measurements were made for crystals of 2 and for an anthracene standard and the collected data presented in FIG. 12. Significantly, FIG. 12 demonstrates the robust tolerance of crystals 1 and 2 to high radiation environments and their ability to withstand substantial radiation dosage and remain luminescent. This suggests that these materials would remain effective as radiation detecting sensors for long periods of time at lower dose rates.

To determine whether other framework structures comprising linker species known to include a luminescent moiety would also provide an IBIL response, the same set of proton beam measurements was made with the material IRMOF-1. This material comprises is linker molecules that include benzene rings which are known to fluoresce. However, no measurable response was observed above the background noise when crystals of IRMOF-1 were exposed to a proton beam, suggesting that including a fluorescent moiety by itself is insufficient to provide a luminescent framework structure. A summary of the measurements made herein is presented below in TABLE 1.

TABLE 1

| SAMPLE | MASS (µg) | DOSE RATE (J/kg/s) | INTENSITY (peak channel counts/J.) $\times 10^6$ | % ANTHRACENE |
|---|---|---|---|---|
| Anthracene | 0.40 | 12000 | 1130. | 100 |
| Crystal 1 | 0.38 | 9330 | 249. | 22 |
| Crystal 2-1 | 0.22 | 10000 | 96.2 | 9 |
| Crystal 2-2 | 0.49 | 9330 | 66.2 | 6 |
| IRMOF-1 | — | — | — | 0 |

Light yield of present embodiments and IRMOF-1 relative to Anthracene

In conclusion, we have prepared two luminescent stilbene-based MOFs where the organic linker serves as the chromophore. The morphology of the material obtained is a function of the synthetic conditions employed. Single-crystal X-ray diffraction and electronic spectroscopy were used to investigate the local environments of the stilbenoid units in the frameworks. In both cases, the ligand becomes rigidified in the trans-geometry upon coordination to the metal, presumably due to inhibition of rotation about the central ethylene bond. In the dense, 2-D layered structure that is crystal 1, the chromophore to environment allows for a limited degree of ligand-ligand interaction. The porous 3-D cubic framework of crystal 2, exhibits less significant interchromophore interaction, and initial studies reveal that crystals of 2 show guest solvent-dependent emission. Sensing with an inherently luminescent MOF is an exciting possibility. In particular, we will attempt to incorporate an actinide, especially thorium and uranium, into one of these stilbene MOF structures. It has been reported previously (see Kim, J.-Y., et al. "Incorporation of uranium(VI) into metal-organic framework solids", *Dalton Transactions*, issue. 14, 2003: pages 2813-2814) to incorporate uranium fluoride into succinate, glutarate, and isophthalate MOFs. It is thought that a similar structure which instead uses stilbene as the linker would provide a structure which would scintillate when exposed to a source of neutrons radiation.

Finally, to the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the disclosures herein are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A hybrid radioluminescent materials system, comprising a coordination polymer comprised of a plurality of metal centers and a plurality of linking molecules, wherein each of the linking molecules comprises a luminescent moiety and two or more coordinating groups, wherein the linking molecules interconnect some or all of the metal centers.

2. The hybrid radioluminescent materials system of claim 1, wherein a plurality of guest atoms or molecules are incorporated into the coordination polymer.

3. The hybrid radioluminescent materials system of claim 1, wherein the coordination polymer is ordered.

4. The hybrid radioluminescent materials system of claim 1, wherein the coordination polymer is amorphous.

5. The hybrid radioluminescent materials system of claim 3 or 4, wherein the coordination polymer is porous.

6. The hybrid radioluminescent materials system of claim 3 or 4, wherein the coordination polymer is dense.

7. The hybrid radioluminescent materials system of claim 1, wherein the two or more coordinating groups are bidentate groups.

8. The hybrid radioluminescent materials system of claim 7, wherein the linking molecule is trans-(4-R,4'-R') stilbene, wherein R and R' are the same or different.

9. The hybrid radioluminescent materials system of claim 8, wherein R and R' are any mono- or poly-coordinating group.

10. The hybrid radioluminescent materials system of claim 8, wherein the linking molecule is trans-4,4'-stilbenedicarboxylic acid.

11. The hybrid radioluminescent materials system of claim 10, wherein the plurality of metal centers comprise one or more zinc atoms.

12. The hybrid radioluminescent materials system of claim 11, further comprising a high boiling point, aprotic, polar solvent.

13. The hybrid radioluminescent materials system of claim 12, wherein the polar solvent is N,N-dimethylformamide.

14. The hybrid radioluminescent materials system of claim 13, wherein the plurality of metal centers each consist essentially of three zinc atoms.

15. The hybrid radioluminescent materials system of claim 14, wherein the coordination polymer comprises an ordered 2-dimensional network array.

16. The hybrid radioluminescent materials system of claim 12, wherein the polar solvent is N,N-diethylformamide.

17. The hybrid radioluminescent materials system of claim 16, wherein the plurality of metal centers consist essentially of $Zn_4O$.

18. The hybrid radioluminescent materials system of claim 17, wherein the coordination polymer comprises an ordered 3-dimensional network array.

19. The hybrid radioluminescent materials system of claim 1 or 2, wherein the materials system emits light induced by a flux of subatomic particles or radiation impinging on or passing through the coordination polymer and exciting the linking molecules and/or the guest atoms or molecules therein.

20. The hybrid radioluminescent materials system of claim 1 or 2, wherein the materials system emits light induced by particles or radiation resulting from a conversion of one or more neutral particles that excite the linker molecules and/or the guest atoms or molecules within the coordination polymer into secondary particles therein.

* * * * *